US012737891B2

(12) United States Patent
Chambers et al.

(10) Patent No.: US 12,737,891 B2
(45) Date of Patent: Sep. 15, 2026

(54) IMAGING-BASED SYSTEM FOR MONITORING QUALITY OF CELLS IN CULTURE

(71) Applicant: Amgen Inc., Thousand Oaks, CA (US)

(72) Inventors: Stuart Chambers, Daly City, CA (US); Britney L. Ragunton, San Francisco, CA (US); Devin Wakefield, Belmont, CA (US)

(73) Assignee: Amgen Inc., Thousand Oaks, CA (US)

( * ) Notice: Subject to any disclaimer, the term of this patent is extended or adjusted under 35 U.S.C. 154(b) by 381 days.

(21) Appl. No.: 18/226,012

(22) Filed: Jul. 25, 2023

(65) Prior Publication Data

US 2024/0046478 A1 Feb. 8, 2024

Related U.S. Application Data

(60) Provisional application No. 63/392,422, filed on Jul. 26, 2022.

(51) Int. Cl.

*G06T 7/11* (2017.01)
*G06T 7/00* (2017.01)
*G06V 20/69* (2022.01)

(52) U.S. Cl.

CPC .............. *G06T 7/11* (2017.01); *G06T 7/0012* (2013.01); *G06V 20/695* (2022.01); (Continued)

(58) Field of Classification Search

None

See application file for complete search history.

(56) References Cited

U.S. PATENT DOCUMENTS 5,978,498 A 11/1999 Wilhelm et al.
2015/0087240 A1 3/2015 Loewke et al.
(Continued)

FOREIGN PATENT DOCUMENTS

WO WO 2021/178605 A1 9/2021

OTHER PUBLICATIONS

Invitation to Pay Additional Fees for International Application No. PCT/US2023/028569 mailed Sep. 21, 2023.
(Continued)

*Primary Examiner* — Jennifer Mehmood
(74) *Attorney, Agent, or Firm* — Wolf, Greenfield & Sacks, P.C.

(57) ABSTRACT

Described herein are techniques to regulate the treatment of a culture of cells having cells corresponding to different cell categories. Some techniques may be used together with a cell imaging and incubation system including an imaging sensor configured to obtain an image of the culture and an incubator configured to incubate the culture. Regulation of treatment of the culture may be based on the processing of an image of the culture obtained by the imaging sensor of the system. The processing may include segmenting the image of the culture into multiple image segments by assigning individual pixels of the image to corresponding cell categories. According to some embodiments, the techniques include determining, based on the image segments, an amount of the culture corresponding to a particular cell category. The amount of the culture corresponding to the particular cell category may inform regulation of the treatment of the culture.

24 Claims, 22 Drawing Sheets

(52) U.S. Cl.
CPC .. *G06V 20/698* (2022.01); *G06T 2207/10056* (2013.01); *G06T 2207/30024* (2013.01)

(56) References Cited

U.S. PATENT DOCUMENTS

| | | | | |
|---|---|---|---|---|
| 2020/0256856 | A1 | 8/2020 | Chou et al. | |
| 2020/0311922 | A1 | 10/2020 | Hara et al. | |
| 2020/0327667 | A1* | 10/2020 | Arbel | G06V 10/267 |
| 2021/0117729 | A1 | 4/2021 | Bharti et al. | |
| 2021/0241121 | A1 | 8/2021 | Tong et al. | |
| 2021/0365668 | A1 | 11/2021 | Ohsaka et al. | |
| 2021/0380910 | A1 | 12/2021 | Chen et al. | |
| 2022/0120664 | A1 | 4/2022 | Rognin et al. | |
| 2023/0086042 | A1* | 3/2023 | Yuan | G06T 7/0016 382/131 |
| 2024/0153289 | A1* | 5/2024 | Masaeli | G06V 20/695 |
| 2025/0265850 | A1* | 8/2025 | Zargari | G06T 7/12 |
| 2025/0349138 | A1* | 11/2025 | Thompson | G06T 5/70 |

OTHER PUBLICATIONS

International Search Report and Written Opinion for International Application No. PCT/US2023/028569 mailed Nov. 21, 2023.

[No Author Listed], Label Free Induced Pluripotent Stem Cell Counting With Deep learning For Automation. SLAS 2019 AI in Process Automation Symposium. Oct. 2019. 2 pages. https://slasaiinprocessautomation.sched.com/event/PnI1/ai-in-screening-label-free-induced-pluripotent-stem-cell-counting-with-deep-learning-for-automation (Last accessed Dec. 7, 2023).

Allison et al., International Stem Cell Initiative. Assessment of established techniques to determine developmental and malignant potential of human pluripotent stem cells. Nature Communications. Dec. 1, 2018;9(1):1925. 15 pages.

Buggenthin et al., Prospective identification of hematopoietic lineage choice by deep learning. Nature methods. Apr. 2017;14(4):403-6.

Christiansen et al., In silico labeling: predicting fluorescent labels in unlabeled images. Cell. Apr. 19, 2018;173(3):792-803.

Elanzew et al., The StemCellFactory: A modular system integration for automated generation and expansion of human induced pluripotent stem cells. Frontiers in Bioengineering and Biotechnology. Nov. 9, 2020;8:580352. 16 pages.

Kusumoto et al., Automated deep learning-based system to identify endothelial cells derived from induced pluripotent stem cells. Stem cell reports. Jun. 5, 2018;10(6):1687-95.

Men et al., Cascaded aurous convolution and spatial pyramid pooling for more accurate tumor target segmentation for rectal cancer radiotherapy. Phys Med Biol. Author manuscript, available in PMC Sep. 17, 2019. Published in final form as Phys Med Biol.; 63(18): 185016. doi:10.1088/1361-6560/aada6c. 18 pages.

Müller et al., A bioinformatic assay for pluripotency in human cells. Nature methods. Apr. 2011;8(4):315-7.

Piao et al., Preclinical efficacy and safety of a human embryonic stem cell-derived midbrain dopamine progenitor product, MSK-DA01. Cell stem cell. Feb. 4, 2021;28(2):217-29.

Piotrowski et al., Deep-learning-based multi-class segmentation for automated, non-invasive routine assessment of human pluripotent stem cell culture status. Computers in Biology and Medicine. Feb. 1, 2021;129:104172.

Rostam et al., Image based machine learning for identification of macrophage subsets. Scientific reports. Jun. 14, 2017;7(1):3521. 11 pages.

Sindagi et al., CNN-based Cascaded Multi-task Learning of High-level Prior and Density Estimation for Crowd Counting. arXiv preprint arXiv:1707.09605. Aug. 16, 2017. 6 pages.

Takahashi, iPS cell-based therapy for Parkinson's disease: A Kyoto trial. Regenerative Therapy. Mar. 1, 2020;13:18-22.

Waisman et al., Deep learning neural networks highly predict very early onset of pluripotent stem cell differentiation. Stem cell reports. Apr. 9, 2019;12(4):845-59.

Wakui et al., Method for evaluation of human induced pluripotent stem cell quality using image analysis based on the biological morphology of cells. Journal of Medical Imaging. Oct. 1, 2017;4(4):044003-. 11 pages.

Wang et al., Segmentation of the clustered cells with optimized boundary detection in negative phase contrast images. PloS one. Jun. 12, 2015;10(6):e0130178. 19 pages.

Xie et al., Microscopy cell counting and detection with fully convolutional regression networks. Computer methods in biomechanics and biomedical engineering: Imaging & Visualization. May 4, 2018;6(3):283-92.

Extended European Search Report dated Nov. 26, 2025 for European Application No. 23847256.7.

* cited by examiner

IMAGING-BASED SYSTEM FOR MONITORING QUALITY OF CELLS IN CULTURE

RELATED APPLICATIONS

This application claims priority under 35 U.S.C. § 119(e) to U.S. Provisional Application 63/392,422, entitled, "IMAGING-BASED SYSTEM FOR MONITORING QUALITY OF CELLS IN CULTURE," filed Jul. 26, 2022, the entire contents of which is incorporated by reference herein.

BACKGROUND

Cell culture is the growth of cells in a controlled environment that can be used for many purposes, such as studying drug impact, modelling diseases, and studying gene variants. Cell culture management involves making decisions about the manner in which to treat the culture to produce high-quality cells.

SUMMARY

Some embodiments provide for a method of regulating treatment of a culture, the culture comprising a plurality of cells, cells in the plurality of cells having one or more respective cell categories selected from a plurality of cell categories, the plurality of cell categories including a first cell category and a second cell category, the method comprising: processing an image of the plurality of cells of the culture to identify, from among the plurality of cell categories, one or more cell categories of cells depicted in the image, the processing comprising: segmenting the image into a plurality of image segments by assigning individual pixels in the image to corresponding cell categories in the plurality of cell categories, the assigning comprising determining, for each of the individual pixels, a respective plurality of values corresponding to a respective plurality of cell categories, each of the plurality of values indicating a likelihood that the pixel corresponds to a cell of a respective cell category in the plurality of cell categories, wherein the plurality of image segments comprises: a first image segment comprising pixels associated with cells of the first cell category; and a second image segment comprising pixels associated with cells of the second cell category; determining, based on the plurality of image segments into which the image is segmented, an amount of cells in the culture corresponding to the first cell category; and regulating the treatment of the culture based on the amount.

Some embodiments provide for at least one non-transitory computer-readable storage medium having encoded thereon executable instructions that, when executed by at least one processor, cause the at least one processor to carry out a method of regulating treatment of a culture, the culture comprising a plurality of cells, cells in the plurality of cells having one or more respective cell categories selected from a plurality of cell categories, the plurality of cell categories including a first cell category and a second cell category, the method comprising: processing an image of the plurality of cells of the culture to identify, from among the plurality of cell categories, one or more cell categories of cells depicted in the image, the processing comprising: segmenting the image into a plurality of image segments by assigning individual pixels in the image to corresponding cell categories in the plurality of cell categories, the assigning comprising determining, for each of the individual pixels, a respective plurality of values corresponding to a respective plurality of cell categories, each of the plurality of values indicating a likelihood that the pixel corresponds to a cell of a respective cell category in the plurality of cell categories, wherein the plurality of image segments comprises: a first image segment comprising pixels associated with cells of the first cell category; and a second image segment comprising pixels associated with cells of the second cell category; determining, based on the plurality of image segments into which the image is segmented, an amount of cells in the culture corresponding to the first cell category; and regulating the treatment of the culture based on the amount.

In some embodiments, assigning individual pixels in the image to corresponding cell categories in the plurality of cell categories comprises classifying the individual pixels according to a plurality of classes, wherein a first class of the plurality of classes corresponds to the first cell category and a second class of the plurality of classes corresponds to the second cell category, and the classifying the individual pixels comprises, for each of the individual pixels, selecting a class into which to classify the individual pixel based on the determined respective plurality of values.

In some embodiments, the assigning is performed using a trained machine learning model, the assigning comprising: processing the image using the trained machine learning model to obtain, for each of the individual pixels, the respective plurality of values corresponding to the respective plurality of categories.

In some embodiments, the trained machine learning model comprises a deep neural network model comprising one or more convolutional layers.

In some embodiments, the deep neural network model comprises a cascade of deep neural network blocks, each of the deep neural network blocks comprising a respective deep convolutional neural network (CNN), and wherein the trained machine learning model performs computations at least in part using atrous spatial pyramid pooling.

In some embodiments, the deep neural network model comprises a U-net architecture.

In some embodiments, the deep neural network comprises at least one million, at least five million, at least 10 million, at least 50 million, at least 100 million, at least 500 million or at least 1 billion parameters whose values are used as part of processing the image using the deep neural network.

Some embodiments further comprise processing the image of the plurality of cells of the culture to estimate culture information for the culture, the culture information for the culture indicating density of cells in the culture of the plurality of cells, wherein segmenting the image comprises segmenting the image based on the culture information.

In some embodiments, the culture information is used to determine coordinates of cells of the plurality of cells, and segmenting the image based on the culture information comprises providing the image and the coordinates as an input to a trained machine learning model to obtain an output indicative of the respective likelihoods that each of the individual pixels corresponds to one of the plurality of cell categories.

Some embodiments further comprise processing the image of the plurality of cells of the culture to estimate culture information for the culture, the culture information for the culture indicating density of cells in the culture of the plurality of cells, regulating the treatment of the culture comprises regulating the treatment of the culture based on the culture information and the amount of the culture corresponding to the first cell category.

In some embodiments, the culture information is used to determine coordinates of cells depicted in the image, and wherein regulating the treatment of the culture based on the culture information comprises: using the coordinates to determine a location of one or more cells of the plurality of cells; and removing cells from the determined location.

In some embodiments, processing the image of the plurality of cells of the culture to estimate the culture information comprises estimating a number of the plurality of cells, a position of at least one cell of the plurality of cells, and/or an inter-nuclear distance between at least two cells of the plurality of cells.

In some embodiments, regulating the treatment of the culture based on the culture information and the amount of the cells in the culture corresponding to the first cell category comprises: outputting a recommendation indicating a time for passaging cells of the plurality of cells of the culture and/or a recommended number of new cultures into which to split the culture.

In some embodiments, regulating the treatment of the culture comprises outputting, based on the amount of the cells in the culture corresponding to the first cell category, a recommendation for modifying a manner in which one or more materials are added to the culture to affect growth of the culture.

In some embodiments, regulating the treatment of the culture comprises modifying a manner in which one or more materials are added to the culture to affect growth of the culture.

In some embodiments, regulating the treatment of the culture comprises outputting, based on the amount of the cells in the culture corresponding to the first cell category, a recommendation for passaging cells of the plurality of cells of the culture.

In some embodiments, regulating the treatment of the culture comprises passaging cells of the plurality of cells of the culture.

In some embodiments, regulating the treatment of the culture comprises outputting a recommendation to discard cells of the plurality of cells of the culture.

In some embodiments, regulating the treatment of the culture comprises discarding cells of the plurality of cells of the culture.

Some embodiments further comprise: comparing the amount of the cells in the culture corresponding to the first cell category to a pre-determined amount; and based on the comparing, regulating the treatment of a second culture to cultivate the second culture to have the pre-determined amount of the first cell category.

In some embodiments, the image of the plurality of cells of the culture comprises a brightfield image.

Some embodiments further comprise obtaining, by an imaging sensor of a cell imaging and incubation system, the image of the plurality of cells of the culture.

In some embodiments, the first cell category corresponds to induced pluripotent stem cells (iPSCs) and the second cell category corresponds to non-iPSCs.

In some embodiments, the plurality of cell categories includes a third cell category, the third cell category corresponding to background, and the plurality of image segments further comprises a third image segment comprising pixels associated with cells of the third cell category.

Some embodiments provide for a cell imaging and incubation system, comprising: an imaging sensor configured to obtain an image of a plurality of cells of a culture; an incubator configured to incubate the culture; at least one processor; and at least one non-transitory computer-readable storage medium having encoded thereon executable instructions that, when executed by at least one processor, cause the at least one processor to carry out a method of regulating treatment of a culture, the culture comprising a plurality of cells, cells in the plurality of cells having one or more respective cell categories selected from a plurality of cell categories, the plurality of cell categories including a first cell category and a second cell category, the method comprising: processing an image of the plurality of cells of the culture to identify, from among the plurality of cell categories, one or more cell categories of cells depicted in the image, the processing comprising: segmenting the image into a plurality of image segments by assigning individual pixels in the image to corresponding cell categories in the plurality of cell categories, the assigning comprising determining, for each of the individual pixels, a respective plurality of values corresponding to a respective plurality of cell categories, each of the plurality of values indicating a likelihood that the pixel corresponds to a cell of a respective cell category in the plurality of cell categories, wherein the plurality of image segments comprises: a first image segment comprising pixels associated with cells of the first cell category; and a second image segment comprising pixels associated with cells of the second cell category; determining, based on the plurality of image segments into which the image is segmented, an amount of cells in the culture corresponding to the first cell category; and regulating the treatment of the culture based on the amount.

Some embodiments further comprise a robotic system configured to transfer the culture within the cell imaging and incubation system between being cultured within the incubator and being imaged by the imaging sensor.

In some embodiments, the robotic system is configured to transfer the culture between being cultured and being imaged upon satisfaction of a timing condition.

In some embodiments, the method further comprises: upon satisfaction of the timing condition, actuating the robotic system to move the culture to the imaging sensor; and actuating the imaging sensor to obtain the image of the plurality cells of the culture.

Some embodiments further comprise an imaging device, wherein the imaging device comprises: the imaging sensor; and a chamber configured to receive a well plate, wherein the well plate is configured to hold the culture.

In some embodiments, the method further comprises: processing the image of the plurality of cells of the culture to estimate culture information for the culture, the culture information for the culture indicating density of cells in the culture of the plurality of cells, wherein segmenting the image comprises segmenting the image based on the culture information.

In some embodiments, the method further comprises: processing the image of the plurality of cells of the culture to estimate culture information for the culture, the culture information for the culture indicating density of cells in the culture of the plurality of cells, wherein regulating the treatment of the culture comprises regulating the treatment of the culture based on the culture information and the amount of the cells in the culture corresponding to the first cell category.

Some embodiments further comprise using the culture information to estimate a number of the plurality of cells, a position of at least one cell of the plurality of cells, and/or an inter-nuclear distance between at least two cells of the plurality of cells.

In some embodiments, regulating the treatment of the culture comprises outputting, based on the amount of the cells in the culture corresponding to the first cell category, a recommendation for modifying a manner in which one or more materials are added to the culture to affect growth of the culture.

In some embodiments, regulating the treatment of the culture comprises outputting, based on the amount of the cells in the culture corresponding to the first cell category, a recommendation for passaging cells of the plurality of cells of the culture.

Some embodiments provide for a method of regulating treatment of a culture, the culture comprising a plurality of cells, cells in the plurality of cells having one or more respective cell categories selected from a plurality of cell categories, the plurality of cell categories including a first cell category and a second cell category, the method comprising: processing an image of the plurality of cells of the culture to identify, from among the plurality of cell categories, one or more cell categories of cells depicted in the image, the processing comprising: segmenting the image into a plurality of image segments by assigning regions of the image to corresponding cell categories in the plurality of cell categories, each of the regions comprising two or more individual pixels in the image, the assigning comprising determining, for each of the regions, a respective plurality of values corresponding to a respective plurality of cell categories, each of the plurality of values indicating a likelihood that the region corresponds to a cell of a respective cell category in the plurality of cell categories, wherein the plurality of image segments comprises: a first image segment comprising regions associated with cells of the first cell category; and a second image segment comprising regions associated with cells of the second cell category; determining, based on the plurality of image segments into which the image is segmented, an amount of cells in the culture corresponding to the first cell category; and regulating the treatment of the culture based on the amount.

BRIEF DESCRIPTION OF DRAWINGS

The accompanying drawings are not intended to be drawn to scale. In the drawings, each identical or nearly identical component that is illustrated in various figures is represented by a like numeral. For purposes of clarity, not every component may be labeled in every drawing. In the drawings.

DETAILED DESCRIPTION

Figure 1A:
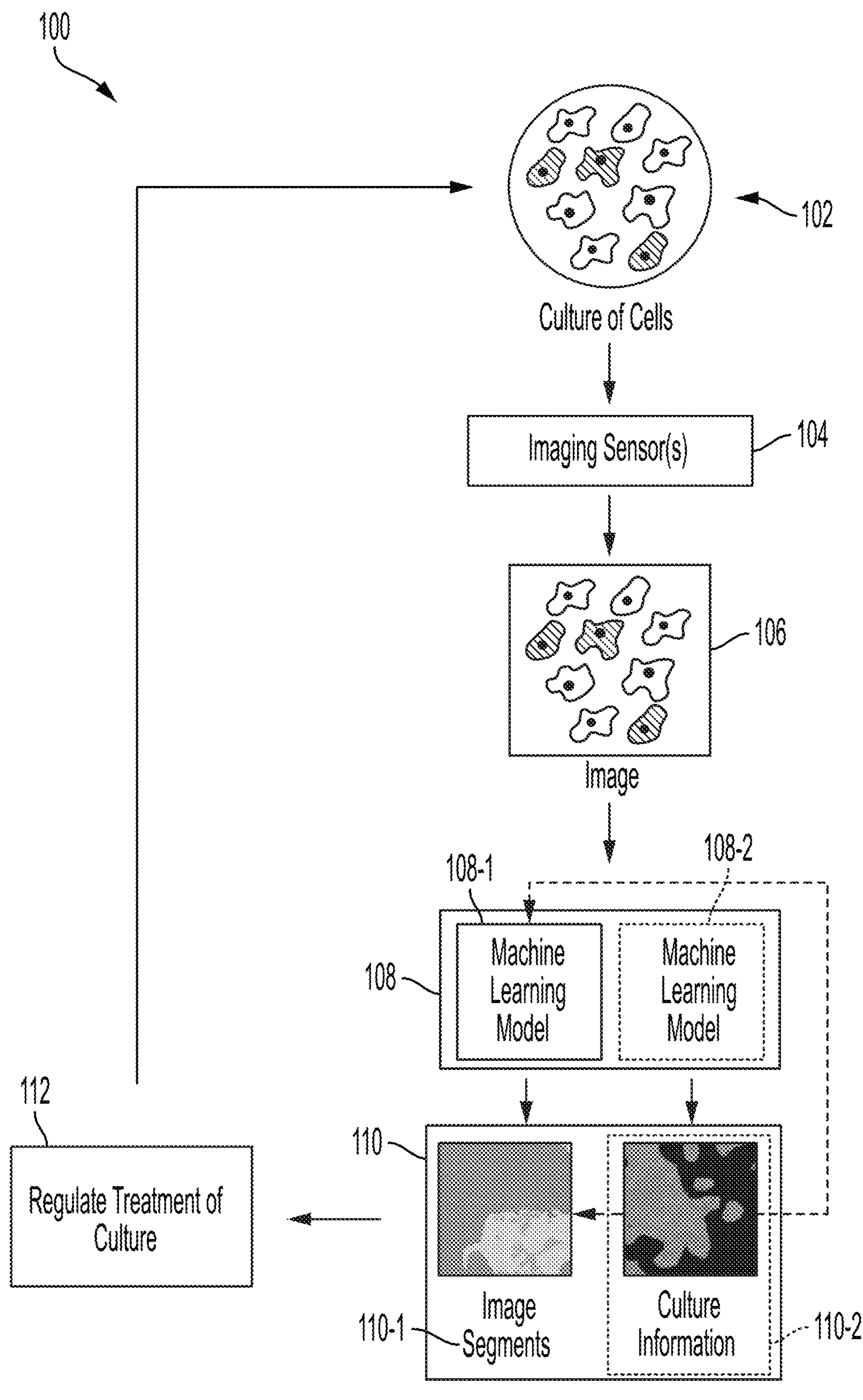
FIG. 1A is a diagram depicting an illustrative technique 100 for regulating treatment of a culture of cells, according to some embodiments of the technology described herein.

Described herein are techniques for regulating treatment of a culture of cells by imaging the cell culture and using machine learning techniques to associate individual pixels in the image to respective cell categories. In some embodiments, a cell category corresponds to a cell type or other characteristic of a cell or group of cells. In some embodiments, the techniques may be used together with a cell imaging and incubation system, which may include an imaging sensor configured to obtain an image of the culture and an incubator configured to incubate the culture. In some such embodiments, regulation of the treatment of the culture may be based on processing of an image of the culture obtained by the imaging sensor of the system. The processing may include segmenting the image of the culture into multiple image segments, which may be done by assigning individual pixels of the image to corresponding cell categories based on a pixel-level evaluation. According to some embodiments, the techniques include determining, based on the image segments, an amount of the culture corresponding to a particular cell category. The amount of the culture corresponding to the particular cell category may inform regulation of the treatment of the culture. For example, such an amount may inform decision making throughout the process of cell culture growth.

Techniques described herein may improve automated cell culture management by providing a more reliable and more accurate determination of the composition of a cell culture than is available through conventional techniques for culture management, including either conventional manual or conventional automated culture management. In some embodiments, results of the composition determination are used to determine a quality of the cell culture. For example, the results may be used to determine metrics such as culture area, size (e.g., min and max dimensions, aspect ratio), shape (e.g., circularity), texture, and roughness. Such metrics may be indicative of whether cells of the culture are healthy and/or whether the cells are differentiating, which are factors that may contribute to the overall quality of the culture. Because the metrics are based on a more accurate determination of culture composition, the resulting quality of the culture can be determined with increased accuracy as compared to conventional approaches. In some embodiments described herein, the results of a culture composition and quality determination may be used to regulate treatment of the cell culture over time. By basing the treatment on the more accurate determination of composition and quality of the cell culture, the treatment decisions may be more accurate and more timely for a current state of the culture, which enables reducing errors and mitigating inefficiencies that are introduced by less accurate, conventional techniques.

For example, some techniques described herein may be used to generate recommendations for treating the cell culture to promote culture growth, prevent waste, and improve the overall efficiency of cell culture maintenance. Such recommendations may include a recommendation for modifying the manner in which materials (e.g., growth factors) are added to or removed from a culture (e.g., quantity of materials to add to and/or remove from the culture and when to do so), a recommendation indicating a timing for passaging cells of the culture, a recommendation indicating a number of new cultures into which to split the culture, a recommendation for discarding cells of the culture, or other suitable culture treatment steps. In some embodiments, such a recommendation may be output to a user, who may implement the recommendation manually or by controlling a semi-automatic system, or to an automated system configured to implement the recommendation. In embodiments where a semi-automatic or automated system is available to partially or fully implement the recommendation, the system may do so in response to receiving the recommendation.

Culturing of cells is the process of growing cells in a controlled environment for a variety of purposes, such as studying the morphology, physiology and biochemistry of cells, monitoring response of the cells to a drug, modelling diseases, evaluating gene variants, and more. Growing a cell culture may involve isolating cells from a tissue, providing them with the appropriate conditions (e.g., temperature, medium, etc.), allowing them to proliferate until they occupy a certain percentage of the available substrate (e.g., reach a confluence threshold), and then passaging the cells by splitting the cells and transferring them to new vessels, allowing for continued expansion of the culture.

Maintaining and regulating treatment of a cell culture can be a manual, laborious, and subjective process, resulting in inefficiencies and inconsistent results. Conventionally, to produce high-quality cells of a correct cell type, a culture is frequently evaluated to inform decisions about culture regulation. Such decisions are often made based on manual visual inspection. While these manual evaluations and decisions are made by highly skilled laboratory technicians, the decisions are inherently subjective, and also subject to human error. Subjective evaluation can be inaccurate and can and too often does lead to decisions that can negatively affect either a single culture (e.g., not feeding or not splitting at a time) or negatively affect an overall culturing process (e.g., investing resources into a culture that can be discarded). This is a universal problem in cell culturing that has been widely experienced for decades, leading to well-known problems in lost time and physical resources.

One type of cell that is often cultured is induced pluripotent stem cells (iPSCs), which are stem cells that may be cultured into different types of cells. In some cases, a stem cell culture may be maintained in an undifferentiated state, where each of the cells in the culture may be stem cells that are not yet developed or are not yet developing into cells having specific functions or structures. In such a case, the culture may be monitored for whether the cells have differentiated and, if not, the culture may be split (upon satisfaction of a condition, such as a time or a size of the culture) into multiple cultures to continue culturing a quantity of undifferentiated stem cells. In such a scenario, if a culture is seen to begin differentiating, a quality of the culture may be related to how much of the culture has differentiated, and cultures that are primarily composed of differentiated cells may be discarded.

Accordingly, in some contexts, a cell culture may be frequently evaluated to ensure growth of cells having the correct cell type. While the culture may be evaluated using fluorescence imaging, sequencing, and similar techniques, these techniques are time-consuming and invasive, which can be damaging to the cells. Accordingly, it is beneficial to use quicker, non-invasive techniques, such as brightfield or phase microscopy, to evaluate the culture. However, it can be challenging to accurately quantify and distinguish between differentiated and undifferentiated cells using such non-invasive techniques due to their high visual similarity. As a result, it is also challenging to determine how to modify treatment of the culture to prevent further cell differentiation. Oftentimes, the culture is discarded due to failure to effectively treat the culture. Any discarding of cultures represents a loss of resources and time, but if a differentiating culture is not identified early enough, time and resources may be spent culturing cells that will ultimately be discarded, leading to further inefficiencies in resources and time.

Even when the cells have the correct cell type, the culture is frequently evaluated to estimate the condition or health of cells in the culture. Based on this estimation, decisions are made about how and when to modify the manner in which the cells are treated. As nonlimiting examples, this may include determining the timing for changing the culture medium, the speed at which to add a particular growth factor, and the amount thereof. Since it is challenging to identify minute changes that can occur in a culture, it is also difficult to determine when and how to modify the manner in which to treat the culture.

Additionally, or alternatively, a cell culture is frequently evaluated to estimate a number of cells in the culture. The estimate is used to inform a timing for passaging the cells in the culture and for determining the number of new cultures into which the culture can be split. However, even a slight misestimation of cell number may result in cells being passaged at the incorrect time (e.g., too early, or too late) and the culture being split into the incorrect number of new cultures. This can lead to cell loss through apoptosis, and it can affect how the cells differentiate, resulting in a culture that ultimately is discarded.

In many circumstances, a conventional approach is to have skilled laboratory personnel perform these evaluations for differentiation, cell condition, or number of cells in culture. As mentioned above, despite the high level of skill, these evaluations are still inherently subjective and suffer from person-to-person variation even within the same organization. This can lead to a trial-and-error approach to culture maintenance that results in lost cells and/or inconsistencies among different cultures.

Various techniques have been employed in an attempt to automate cell culture management. However, these techniques have limitations and do not address the above-identified issues associated with culture management. For example, one conventional technique involves using image tile-based classification to try to evaluate a cell culture. Such techniques rely on capturing an image of a culture and dividing the image into multiple tiles, then analyzing each tile to identify what is depicted in that tile. A tile refers to an image depicting a portion of a larger image such as, for example, an image of a cell culture. When an image is divided into multiple tiles, the multiple tiles may include images depicting overlapping portions of a larger image. This technique is inherently limited in its accuracy, as its accuracy is linked to the quality of the tiling process and on the size/precision of the tiles. Moreover, because the tile analysis involves comparing a tile to previously-viewed known tiles to identify a closest match (and thereby identify the tile as including the same contents as the matched prior tile), a reliable analysis of each tile depends on having a sufficient number of training tiles of each type of tile that may be viewed by the system. Compiling the training data represents a high administrative burden on implementation of the system. Increasing the size of the tiles allows for fewer tiles and a possible reduction of burden in data collection, but increasing the tile size leads to a corresponding decrease in accuracy. These limitations in accuracy have meant that conventional automated analysis techniques have not reliably out-performed the manual, subjective interpretation by skilled laboratory technicians, leading to the continued use of the manual process despite its limitations discussed above. Where conventional automated analysis techniques are used, their limitations in accuracy continue to lead to errors in regulation of the treatment of the cell culture.

Conventional automated techniques for cell analysis are further limited in that they cannot identify a cell or a cell culture that is in an intermediate state of a cycle (e.g., a cell life cycle or a differentiation cycle), rather than purely in a starting state or an ending state. Conventional techniques are limited to making a binary decision about what a tile of an image depicts. For example, conventional techniques may be used to determine whether or not a tile includes cells of a particular cell type, which may be an undifferentiated cell or a differentiated cell, or one that is in a steady state of a cell life cycle. However, such techniques would not capture the transition of the cells or cell culture between two different states, such as a transition of a culture from one cell type to another. Accordingly, using conventional techniques, treatment decisions are based solely on whether the tile is primarily of one particular cell type or another. These decisions do not consider the presence in a culture of cells that are transitioning between cell states or a culture that includes cells at various stages of a cycle, and which may use different types or different levels of treatment than cultures that are of a single, non-intermediate type. These limitations mean culture composition cannot be accurately identified, which can contribute to errors in regulation of the treatment of the cell culture.

With respect to estimating the number of cells in a culture, conventional automated techniques rely on estimating the number of cells based on a measure of confluence of the culture. Confluence refers to the amount of a culture substrate occupied by cells of the culture. Despite the wide use of confluence in both automated analysis and manual analysis, confluence-based cell counting techniques are insufficient for accurately estimating the number of cells in the culture. Confluence-based techniques do not account for the range of cell compaction and area. As described above, such misestimation of the number of cells in the culture contributes to errors in regulation of the treatment of the cell culture.

The inventors have recognized and appreciated that such challenges and inefficiencies may be mitigated by improved automated systems for analyzing images of cells in culture. Some techniques described herein include more reliable and/or more accurate approaches for quantifying the number of cells in a cell culture, estimating cell categories for cells in the culture based on image analysis and segmentation at the pixel level, and/or regulating the treatment of the culture based on the results of such techniques.

The inventors have developed systems and methods for regulating the treatment of a cell culture. In some embodiments, the techniques include estimating culture information for the cell culture, such as, for example, information indicative of density, cell count, and/or cell location.

For example, this may include using a machine learning model. The machine learning model may be implemented using one or more convolutional neural networks (CNNs) and may be adapted to determine the number of cells in a cell culture. In some embodiments, the model may generate information indicating a density of cells in different areas of a culture, such as a density map. The information may also include an identification of positions of individual cells in the culture, such as in a coordinate system for the culture or for an image of the culture. Techniques that use a machine learning model improve upon conventional techniques and mitigate the disadvantages of the above-described disadvantages associated with cell culture management by accounting for cell compaction and area, leading to a more accurate estimation of cell count. This can lead to an improvement in the regulation of the treatment of the culture, resulting in higher-quality cells and consistency among independent cultures.

In some embodiments, the techniques developed by the inventors and described herein include machine learning techniques for estimating a composition of a cell culture. The techniques include segmenting an image of the cell culture by evaluating individual pixels of an image of cells in culture and identifying corresponding cell categories associated with each pixel. As discussed in more detail below, a cell category may, in some cases, relate to a cell type. An image may be segmented into different segments that each correspond to a cell category, based on identifying for each pixel a respective cell category and identifying segments that contain pixels associated with a common cell category. In some embodiments, culture information, which may be generated using the cell counting techniques described above, can be used to inform the segmenting, leading to increased efficiency and accuracy of the resulting pixel assignments. Some techniques described herein may result in a more accurate estimation of the cell composition of the culture by attaining a pixel-level resolution of the composition of the cell culture. By reducing inaccuracies of conventional techniques, the techniques improve the automated regulation of the treatment of the culture, enabling production of consistent, high-quality cell cultures, while also enabling reduced waste and decreased inefficiencies.

A cell category may relate to one or more characteristics of a cell or of a group of cells, such as one or more morphological and/or functional characteristics of a cell. Such a morphological characteristic may include a shape of a cell or a shape of a group of the cells. In some embodiments, such a characteristic may be an observable characteristic of a cell or a group of the cells, such as one that may be determined from a depiction (e.g., image) of the cell(s). Such an observable characteristic may be a marker that a cell or group of cells may exhibit, such as a particular morphological structure (e.g., clustering of cells). Based on the presence or absence of one or more markers, a cell or group of cells may be identified as being in one category or another category.

In some embodiments, a cell category may in some embodiments relate to a differentiation status of the cell(s). Such a differentiation status may relate to a specific cell, such as whether a particular cell is an undifferentiated stem cell or a cell that is or has started to differentiate and is thus not undifferentiated, or relate to a group of cells, such as whether the group includes all undifferentiated cells or some amount of not undifferentiated cells. A cell category may in some embodiments relate to a cell type, which may be a type of a cell such as an undifferentiated stem cell or a particular type of cell that has started to differentiate or is differentiated, such as a cell that is of a particular anatomical structure (e.g., organ) or arranged to perform a particular anatomical function. Position of particular cell organelles within a cell may also, in some embodiments, be a factor on which cell category is based. In cases where a cell category may relate to a cell type, such cell types may include intermediate cell types that may be progenitor cells for other cell types during a development cycle of cells. In some embodiments in which a cell category relates to cell type, the cell category may be for a group of cells and may relate to the one or more types of cells present in the group of cells.

In some embodiments, a cell category may relate to a stage of a cell cycle, which may be a process that a cell performs during its life. Such a cell cycle may be, for example, mitosis, and the stage of the cell cycle may be a stage of mitosis. A cell category may relate to a vital status of the cell, such as whether the cell is dead or alive. A cell category may also relate to a level of proliferation, such as cellular growth rate.

In some embodiments, a cell category may relate to an experimental population to which a cell or group of cells belongs, such as whether the cell belongs to a control population or a population that is the subject of an experiment, such as by having undergone perturbation, genetic mutation, or other experiment.

In some embodiments, a cell category may relate to a combination of the foregoing factors, or a system may operate with multiple cell categories that each relate to a different one or combinations of the foregoing. Embodiments are not limited to operating with any of the specific examples of cell categories described above.

In some embodiments, an image segmentation process in accordance with techniques described herein may analyze an image (e.g., on a pixel-by-pixel basis, as described herein) and identify a category into which to classify each pixel. In some such image segmentation processes, the process may estimate values indicating the likelihood that a pixel is associated with respective cell categories. In doing so, in some cases the image segmentation process may identify for a pixel multiple categories into which to classify a pixel, and each of the multiple categories may be associated with a respective (and potentially different) value indicating likelihood. A review of the values indicating the likelihood may then result in a selection of a cell category for a pixel, such as by selecting the category with the highest measure of likelihood or other evaluation (examples of which are given below).

In some embodiments, an image segmentation process may analyze an image using a machine learning model trained to identify the category into which to classify each pixel. In some embodiments, the image comprises a two-dimensional (2D) matrix of data points, and a pixel in the image corresponds to a single data point in the 2D matrix. Accordingly, the 2D matrix may be provided as input to a machine learning model to obtain an output identifying, for a data point in the 2D matrix, multiple categories into which to classify the data point. In some other embodiments, the image comprises a 2D matrix of data points, and a pixel in the image corresponds to a plurality of data points in the 2D matrix. Accordingly, the 2D matrix may be provided as input to a machine learning model to obtain an output identifying, for a plurality of data points in the 2D matrix, multiple categories into which to classify the plurality of data points.

Additionally, or alternatively, in some embodiments, an image segmentation process may analyze an image and identify a category into which to classify a region of the image. For example, a region of the image may comprise two or more individual pixels in the image. In some embodiments, the two or more pixels are neighboring pixels. For example, in a 2D matrix of data points, neighboring pixels include entries in the 2D matrix that orthogonally or diagonally adjacent.

Various examples of ways in which these techniques and systems can be implemented are described below. It should be appreciated, however, that embodiments are not limited to operating in accordance with these examples. Other embodiments are possible.

FIG. 1A is a diagram depicting an illustrative technique 100 for regulating treatment of a culture 102 of cells by processing an image 106 of the culture 102 using one or more machine learning model(s) 108 to generate output 110 including image segments 110-1 and/or culture information 110-2.

In some embodiments, the culture 102 comprises any suitable type(s) of cells. For example, the culture 102 may include cells of a same type and/or cells of multiple (e.g., two or more) different types. As a nonlimiting example, in some embodiments, the culture 102 includes pluripotent stem cells. Pluripotent stem cells are undifferentiated or partially differentiated cells that have the ability to self-renew and to differentiate into various types of cells. As another example, the culture 102 may include induced pluripotent stem cells (iPSCs), which are a type of pluripotent stem cell derived from adult somatic cells that have been genetically reprogrammed to an embryonic stem cell-like state. Additionally, or alternatively, the culture 102 may include cell types into which the pluripotent stem cells and/or iPSCs differentiated. However, it should be appreciated that the culture 102 comprises any suitable type of cell, as aspects of the technology described herein are not limited in this respect.

In some embodiments, the culture 102 is grown in any suitable type of vessel. For example, the type of vessel may depend upon the type of experiment(s) that are to be performed on the culture 102 and/or the type of imaging sensor(s) used to capture images of the culture 102. For example, the culture 102 may be grown on a cover-slip, in a petri dish, in a sample well, in a multi-well plate (e.g., a microplate), in a culture flask, on an OptoSelect™ chip, or using any other suitable type of vessel.

The imaging sensor(s) 104, in some embodiments, are used to capture an image 106 of the culture 102. The imaging sensor(s) 104 may include any suitable type of imaging sensor, such as, for example, an imaging sensor capable of capturing brightfield, phase contrast, and/or fluorescent images. For example, the imaging sensor(s) 104 may include a microscope imaging system having one or more cameras, such as the Celigo® Imaging Cytometer, the Beacon® Optofluidic System, the Incucyte® Live-Cell Analysis Systems and/or the Opera Phenix® High-Content Screening System.

In some embodiments, the imaging sensor(s) 104 automatically capture image 106. For example, the imaging sensor(s) 104 may automatically capture images at specified time intervals. Additionally, or alternatively, the imaging sensor(s) 104 may automatically capture image 106 after the culture 102 is detected in a field of view of the imaging sensor(s) 104 and/or in a particular position with respect to the imaging sensor(s) 104. In some embodiments, the imaging sensor(s) 104 capture image 106 in response to receiving user input indicating when to capture the image 106.

In some embodiments, the image 106 includes an image of all or a portion of the culture 102. For example, the image 106 may depict one, some, or all of the wells of a multi-well plate. Additionally, or alternatively, the image 106 may depict one, some, or all of the cells in the culture 102. In some embodiments, the image 106 is a brightfield image, phase contrast image, fluorescence image, and/or an image captured using any other suitable imaging modality. In some embodiments, any suitable image processing techniques may be used to process the image 106 captured using image sensor(s) 104, as aspects of the technology described herein are not limited in this respect.

In some embodiments, image 106 is processed using one more trained machine learning model(s) 108 to obtain image segments 110-1 and/or culture information 110-2. In some embodiments, different machine learning models are used to obtain the image segments 110-1 and the culture information 110-2. For example, in the embodiment of FIG. 1A, machine learning model 108-1 is used to obtain the image segments 110-1 and machine learning model 108-2 is used to obtain culture information 110-2.

In some embodiments, the image 106 comprises a two-dimensional (2D) matrix of data points. In some embodiments, an individual pixel in the image 106 comprises (e.g., consists of) an individual data point in the 2D matrix. In some embodiments, a region of the image 106 comprises two or more individual pixels in the image. Accordingly, a region may comprise a group of two or more data points in the 2D matrix. In some embodiments, the two or more pixels are neighboring pixels, meaning they comprise two or more data points that are orthogonally or diagonally adjacent to one another in the 2D matrix.

In some embodiments, the image 106 (e.g., the 2D matrix) is provided to machine learning model 108-1 to obtain image segments 110-1. The machine learning model 108-1 may be of any suitable type. For example, the machine learning model may be a neural network, such as a deep neural network model. The deep neural network model may have any of numerous types of architectures and may comprise any suitable type of layer. For example, the deep neural network model may include a convolutional neural network (CNN), a U-Net network, a DeepLab network or any of its versions (e.g., DeepLabv1, DeepLabv2, DeepLabv3, and DeepLabv3+), or any other suitable deep learning network architecture. The neural network may have one or more convolutional layers. In some embodiments, the final layer of the deep neural network may be modified to account for a set of labels corresponding to a set of cell categories (e.g., iPSCs, non-iPSCs, and background).

The architecture of the deep neural network model may include one or more base blocks implemented using ResNet, MobileNet, Xception, or any other suitable deep learning network or any variation of such a deep learning network, as aspects of the technology described herein are not limited in this respect. In some embodiments, the deep learning network may have any suitable depth. Depth, in some embodiments, is the largest number of sequential convolutional or fully connected layers on a path from the input to the output layer. For example, the deep learning network may be 18 layers deep (e.g., ResNet-18), 50 layers deep (e.g., ResNet-50), 53 layers deep (e.g., MobileNet-v2), 71 layers deep (e.g., Xception), or any other suitable depth, as aspects of the technology are not limited in this respect. In some embodiments, the deep learning network has any suitable number of layers, as aspects of the technology are not limited in this respect. For example, the deep learning network may have 177 total layers and 54 convolutional layers (e.g., ResNet-50). However, it should be appreciated that the deep learning network may have a greater or fewer number of layers. In some embodiments, the deep neural network takes any suitable resolution image such as, for example, an image input size of 224-by-224, 299-by-299, 1080-by-1080, or 1958-by-1958. Aspects of DeepLab are described in Chen, Liang-Chieh et al. "DeepLab: Semantic Image Segmentation with Convolutional Nets, Atrous Convolution, and Fully Connected CRFs." IEEE Transactions on Pattern Analysis and Machine Intelligence, vol. 40, no. 4, pp. 834-848 (2017), and in Chen, Liang-Chieh et al. "Encoder-decoder with atrous separable convolution for semantic image segmentation." In: Ferrari, V., Hebert, M., Sminchisescu, C., Weiss, Y. (eds.) ECCV 2018. LNCS, vol. 11211, pp. 833-851. Springer, Cham (2018), each of which is incorporated by reference herein in its entirety. Aspects of ResNet are described in He, K. et al. "Deep Residual Learning for Image Recognition." CVPR (2016), which is incorporated by reference herein its entirety.

Regardless of the specific type of machine learning model used as part of the illustrative technique 100, the machine learning model 108-1 outputs image segments 110-1 corresponding to the image 106. An image segment may include one or more pixels associated with a cell category. For example, as shown in the embodiment of FIG. 1A, the image segments 110-1 include pixels associated with three different cell categories. For example, some image segments may include pixels associated with iPSCs, some image segments may include pixels associated with non-iPSCs, and some image segments may include pixels associated with a non-cell category. However, it should be appreciated that the machine learning model 108-1 may output image segments including pixels associated with any suitable number or type of cell category, as aspects of the technology described herein are not limited in this respect.

In some embodiments, the image 106 is optionally provided to machine learning model 108-2 to obtain culture information 110-2. The machine learning model 108-2 may be of any suitable type. For example, the machine learning model 108-2 may be a neural network, such as a convolutional neural network (CNN) model. In some embodiments, the neural network comprises two portions each configured to process the input using convolutional layers. In some embodiments, the first portion is configured to approximate cell counts and classify an image into a threshold number of classes. The threshold number may be any suitable number of classes such as, for example, 10 classes, as aspects of the technology described herein are not limited in this respect. In some embodiments, the first portion is configured to classify an image into a class based on the approximate number of cells within the image. The information generated by the first portion of the network may be used by the second portion of the network to generate a density map. In some embodiments, the first portion and the second portion each comprises any suitable number of convolutional layers, as aspects of the technology described herein are not limited in this respect. For example, the CNN may use the architecture described in Sindagi, V. A. and Patel, V. M. J. "CNN-based Cascaded Multi-task Learning of High-level Prior and Density Estimation for Crowd Counting." arXiv:1707.09605 (2017), which is incorporated by reference herein in its entirety.

Regardless of the specific type of machine learning model used as part of illustrative technique 100, the machine learning model 108-2 outputs culture information 110-2 corresponding to the image 106. In some embodiments, the culture information includes a cell count indicating the number of cells depicted in the image 106. In some embodiments, the culture information 110-2 is indicative of the physical location of cells in the image 106. For example, the culture information 110-2 may include a three-dimensional density map in which density is distributed along x- and y-coordinates of the image 106.

As shown in the embodiment of FIG. 1A, the culture information 110-2 is optionally used to obtain the image segments 110-1. For example, the culture information 110-2 may be provided as input to the machine learning model 108-1 used for predicting the image segments 110-1. The machine learning model 108-1 may process the culture information 110-2 to estimate the probability that a cell or a particular cell type is present at a location associated with a pixel or group of pixels.

Additionally, or alternatively the culture information 110-2 is optionally compared to the image segments 110-1 to determine whether there is a correlation between them. For example, the culture information 110-2 may indicate whether there are cells present at a location corresponding to particular pixels, while the image segments 110-1 may indicate whether those pixels are associated with a particular cell category. This correlation may be used to identify cells that are associated with a pre-determined cell category and to detach those cells from their identified location. The pre-determined cell category may comprise any type of cell category. In some embodiments, the pre-determined cell category may comprise one or more cell categories. For instance, the pre-determined cell category may comprise a first pre-determined cell category representing a first cell type (e.g., an iPSC) or a second pre-determined cell category representing a second cell type (e.g., a non-iPSC). In another example, the pre-determined cell category may comprise a first pre-determined cell category representing a first cell type (e.g., a neuron cell type), a second pre-determined cell category representing a second cell type (e.g., a mesenchymal cell type), or a third pre-determined cell category representing a background portion (e.g., region of an image that does not include cells). In another example, the pre-determined cell category may comprise a first pre-determined cell category representing a first differentiation status of a cell (e.g., a differentiated cell), a second pre-determined cell category representing a second differentiation status of a cell (e.g., an undifferentiated cell), and a third pre-determined cell category representing a third differentiation status of a cell (e.g., a partially differentiated cell). In another example, the pre-determined cell category may comprise a first pre-determined cell category representing a first stage of a cell cycle (e.g., G1 phase), a second pre-determined cell category representing a second stage of a cell cycle (e.g., S phase), a third pre-determined cell category representing a third stage of a cell cycle (e.g., G2 phase), a fourth pre-determined cell category representing a fourth stage of a cell cycle (e.g., M phase), and a fifth pre-determined cell category representing a fifth stage of a cell cycle (e.g., G0 phase). In another example, the pre-determined cell category may comprise a first pre-determined cell category representing a first experimental group (e.g., a control group) and a second pre-determined cell category representing a second experimental group (e.g., a treatment group).

In some embodiments, the image segments 110-1 and (optionally) the culture information 110-2 are used to regulate treatment 112 of the culture 102. For example, the image segments 110-1 and/or culture information 110-2 may be indicative of the type, health, differentiation state, and/or quantity of cells in the culture. This information can be used, in turn, to inform decisions relating to the treatment of the culture 102 and/or other cultures. For example, the image segments 110-1 and/or culture information 110-2 may be used to inform decisions relating to passaging the cells, such as, for example, when to passage the cells, the number of new cultures into which to split the culture, and whether to discard cells in the culture. The image segments 110-1 and/or culture information 110-2 may be used to inform decisions relating to the manner in which to treat the culture, or future cultures, such as, for example, when to feed the culture, what to feed the culture, and the amount thereof. Examples of culture treatment recommendations are further described herein, including at least with respect to FIG. 2C.

In some embodiments, one or more users regulate treatment 112 of the culture manually or semi-automatically. For example, illustrative technique 100 may include outputting a recommendation to the one or more users (e.g., via a user interface) for regulating treatment 112 of the culture 102, and the user may perform the regulation and/or provide user input to a system that causes the system to perform the treatment regulation. In some embodiments, regulating the treatment 112 of the culture is performed automatically. For example, a processor may generate a recommendation for regulating treatment 112 of the culture and cause a system to perform the regulation without user intervention.

Figure 1B:
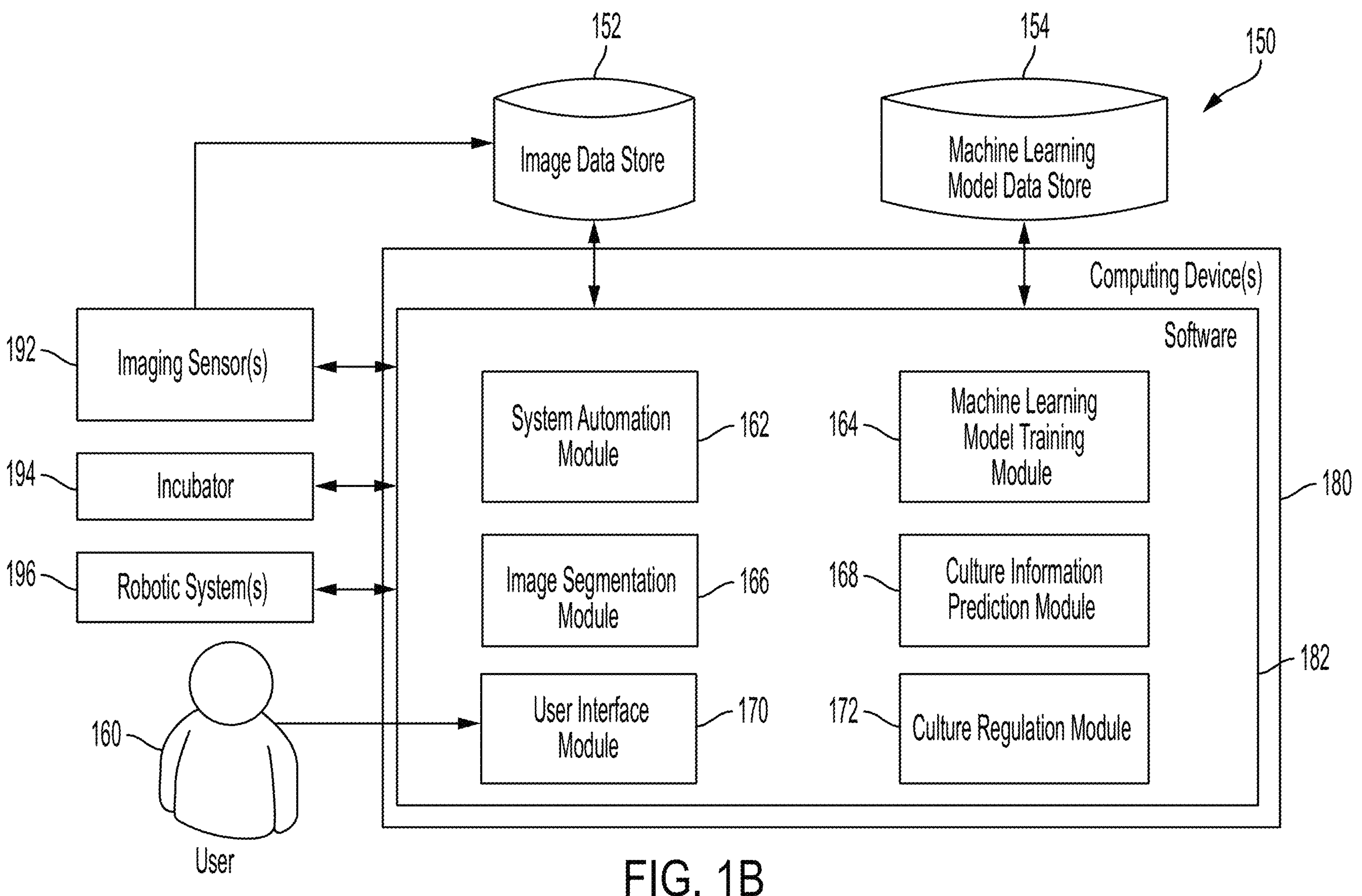
FIG. 1B is a block diagram of an example system 150 for regulating treatment of a culture of cells, according to some embodiments of the technology described herein.

FIG. 1B is a block diagram of an example system 150 for regulating treatment of a culture of cells, according to some embodiments of the technology described herein. System 150 includes a computing device(s) 180 that is configured to have software 182 execute thereon to perform various functions in connection with evaluating and regulating treatment of a culture of cells.

The computing device(s) 180 can be one or multiple computing devices of any suitable type. For example, the computing device(s) 180 may be a portable computing device (e.g., a laptop, a smartphone) or a fixed computing device (e.g., a desktop computer, a server). When computing device(s) 180 includes multiple computing devices, the devices may be physically co-located (e.g., in a single room) or distributed across multiple physical locations. In some embodiments, the computing device(s) 180 may be part of a cloud computing infrastructure.

In some embodiments, the computing device(s) 180 may be operated by one or more user(s) 160 such as one or more researchers and/or other individual(s). For example, the user(s) 160 may provide user input indicating that the imaging sensor(s) 192 can capture images of a culture, input specifying processing or other methods to be performed on captured images, and/or input specifying how treatment of a culture can be regulated.

As shown in the embodiment of FIG. 1B, software 182 includes a plurality of modules. Each module may include processor-executable instructions that, when executed by at least one computer-hardware processor, cause the at least one computer-hardware processor to perform the function(s) of that module. Such modules are sometimes referred to herein as "software modules." The software modules shown in FIG. 1B include processor-executable instructions that, when executed by a computing device, cause the computing device to perform one or more processes, such as the processes described herein including at least with respect to FIGS. 2A-2B and 5B. It should be appreciated that the modules shown in FIG. 1B are illustrative and that, in other embodiments, software 182 may be implemented using one or more other software modules in addition to or instead of the modules shown in FIG. 1B. In other words, software 182 may be organized differently from how it is illustrated in FIG. 1B.

As shown in FIG. 1B, software 182 includes multiple software modules for evaluating and regulating treatment of a culture of cells, such as image segmentation module 166, culture information prediction module 168, culture regulation module 172, and system automation module 162. In the embodiment of FIG. 1B, the software 182 additionally includes machine learning model training module 164 for training one or more machine learning models and user interface module 170 for obtaining user input.

In some embodiments, the image segmentation module 166 obtains an image from imaging sensor(s) 192 or image data store 152, obtains a trained machine learning model from machine learning model data store 154, and processes the obtained image using the obtained machine learning model to segment the image. For example, the image segmentation module 166 may process the image using the machine learning model to predict, for pixels in the image, respective cell categories associated with the pixels. Techniques for segmenting an image are described herein including at least with respect to process 250 of FIG. 2B.

In some embodiments, the culture information prediction module 168 obtains an image from imaging sensor(s) 192 or image data store 152, obtains a trained machine learning model from machine learning model data store 154, and processes the obtained image using the obtained machine learning model to obtain culture information corresponding to the image. For example, the culture information prediction module 168 may process the image to estimate the number of cells in the image and/or to generate a density map indicative of the locations of cells in the image. Techniques for obtaining culture information are described herein including at least with respect to act 204 of process 200 shown in FIG. 2A.

In some embodiments, the culture regulation module 172 obtains image segments from the image segmentation module 166 and/or culture information from the culture information prediction module 168 and uses the obtained image segments and/or culture information to generate a recommendation for regulating treatment of a cell culture. For example, the culture regulation module 172 may determine when to passage cells of the culture, the number of cultures into which to split the culture, whether to discard the culture, whether to feed the culture, what to feed the culture, and/or the amount thereof. Example recommendations for regulating treatment of a cell culture are further described herein including at least with respect to FIG. 2C.

In some embodiments, the culture treatment regulation recommendations may be output by the culture regulation module 172. For example, the recommendations may be output to user(s) 160 via user interface module 170. Additionally, or alternatively, the recommendations may be output to the system automation module 162.

User interface module 170 may be a graphical user interface (GUI), a text-based user interface, and/or any other suitable type of interface through which a user may provide input and view information generated by the software 182. For example, in some embodiments, the user interface may be a webpage or a web application accessible through an Internet browser. In some embodiments, the user interface may be a GUI of an app executing on the user's mobile device. In some embodiments, the user interface may include a number of selectable elements though which the user may interact. For example, the user interface may include dropdown lists, checkboxes, text fields, or any other suitable element.

System automation module 162 is configured to control one or more of the imaging sensor(s) 192, incubator 194, and/or robotic system(s) 196. For example, the system automation module 162 may cause the robotic system(s) 196 to manipulate cells in the culture (e.g., detach, spit, or discard cells), manipulate materials (e.g., culture medium, growth factors) with respect to the culture to modify the culture medium, and/or move the culture between the imaging sensor(s) 192 and incubator 194. Additionally, or alternatively, the system automation module 162 may cause the imaging sensor(s) 192 to capture images of the cell culture. Additionally, or alternatively, the system automation module 162 may cause the incubator 194 to adjust its temperature or other settings. Example system automation software includes Overlord™ Scheduling Software. Example automated systems and techniques for using such systems are described herein including at least with respect to FIGS. 5A-5B.

In some embodiments, the system automation module 162 is configured to control the imaging sensor(s) 192, incubator 194, and/or robotic system(s) 196 in response to obtaining the culture treatment regulation recommendation from the culture regulation module 172. Additionally, or alternatively, the system automation module 162 is configured to control the imaging sensor(s) 192, incubator 194, and/or robotic system(s) 196 independent of receiving output from the culture regulation module 172. For example, the system automation module 162 may control the imaging sensor(s) 192, incubator 194, and/or robotic system(s) 196 to perform periodically, in response to user input by user(s) 160, and/or in response to receiving output from another software module.

Imaging sensor(s) 192 include imaging sensor(s) of any suitable type. In some embodiments, the imaging sensor(s) 192 are configured for brightfield imaging, phase contrast imaging, and/or fluorescence imaging. For example, the imaging sensor(s) 192 may include a microscope imaging system having one or more cameras. Example imaging sensor(s) are described herein including at least with respect to FIG. 1A.

Incubator 194 includes any suitable type of culture incubation system. The incubator 194 may be configured to regulate the temperature, humidity, and/or $CO_2$ levels in an environment where the culture of cells can be stored. For example, the incubator 194 may include an input for $CO_2$, a water tank for humidity, and/or a thermal regulation device for temperature control. The incubator 194 may be automatic or semi-automatic, meaning the incubator self-regulates the environmental conditions (e.g., temperature, humidity, and/or $CO_2$ levels) or regulates the environmental conditions in response to user input. Additionally, or alternatively, the incubator 194 may be manual, meaning that a user regulates the environmental conditions. Example incubators include the Cytomat™ automated incubator and the LiCONic STX500 automated incubator.

Robotic system(s) 196 include any suitable robotic system configured to handle and/or manipulate a culture of cells. A robotic system may include a liquid handler configured to add or remove materials from a culture. A robotic system may include a robotic arm configured to handle a culture (e.g., move the culture between an incubator and an imaging platform). Example robotic systems include Hamilton Microlab STAR Liquid Handling System and the PF3400 SCARA robot.

As shown in FIG. 1B, example system 150 also includes image data store 152 and machine learning model data store 154. In some embodiments, software 182 obtains data from image data store 152, machine learning model data store 154, and/or user(s) 160 (e.g., by uploading data). In some embodiments, the software further includes machine learning model training module 164 for training one or more machine learning models (e.g., stored in machine learning model data store 154).

In some embodiments, the images are obtained from the image data store 152. The image data store 152 may be of any suitable type (e.g., database system, multi-file, flat file, etc.) and may store image data in any suitable way and in any suitable format, as aspects of the technology described herein are not limited in this respect. The image data store 152 may be part of or external to computing device(s) 180.

In some embodiments, the image data store 152 includes image data obtained for a culture of cells, as described herein including at least with respect to FIG. 1A. In some embodiments, the stored image data may have been captured using imaging sensor(s) 192, previously-uploaded by a user (e.g., user(s) 160), and/or from one or more public data stores. In some embodiments, a portion of the image data may be processed by the image segmentation module 166 to obtain image segments. In some embodiments, a portion of the image data may be processed by culture information prediction module 168 to obtain culture information. In some embodiments, a portion of the image data may be used to train one or more machine learning models (e.g., with machine learning model training module 164).

In some embodiments, the image segmentation module 166 and/or the culture information prediction module 168 obtains (eithers pulls or is provided) respective trained machine learning models from the machine learning model data store 154. The machine learning models may be provided via a communication network (not shown), such as the Internet or other suitable network, as aspects of the technology described herein are not limited to any particular communication network.

In some embodiments, the machine learning model data store 154 stores one or more machine learning models used to segment an image of a culture and/or to obtain culture information corresponding to an image of a culture. The machine learning model data store 154 may be of any suitable type (e.g., database system, multi-file, flat file, etc.) and may store machine learning models in any suitable way and in any suitable format, as aspects of the technology described herein are not limited in this respect. The machine learning model data store 154 may be part of or external to computing device(s) 180.

In some embodiments, the machine learning model training module 164, referred to herein as training module 164, may be configured to train the one or more machine learning models to segment an image of a culture of cells and/or to obtain culture information for an image of a culture of cells. In some embodiments, the training module 164 trains a machine learning model using a training set of image data. For example, the training module 164 may obtain training data from the image data store 152. In some embodiments, the training module 164 may provide trained machine learning model(s) to the machine learning model data store 154.

Figure 2A:
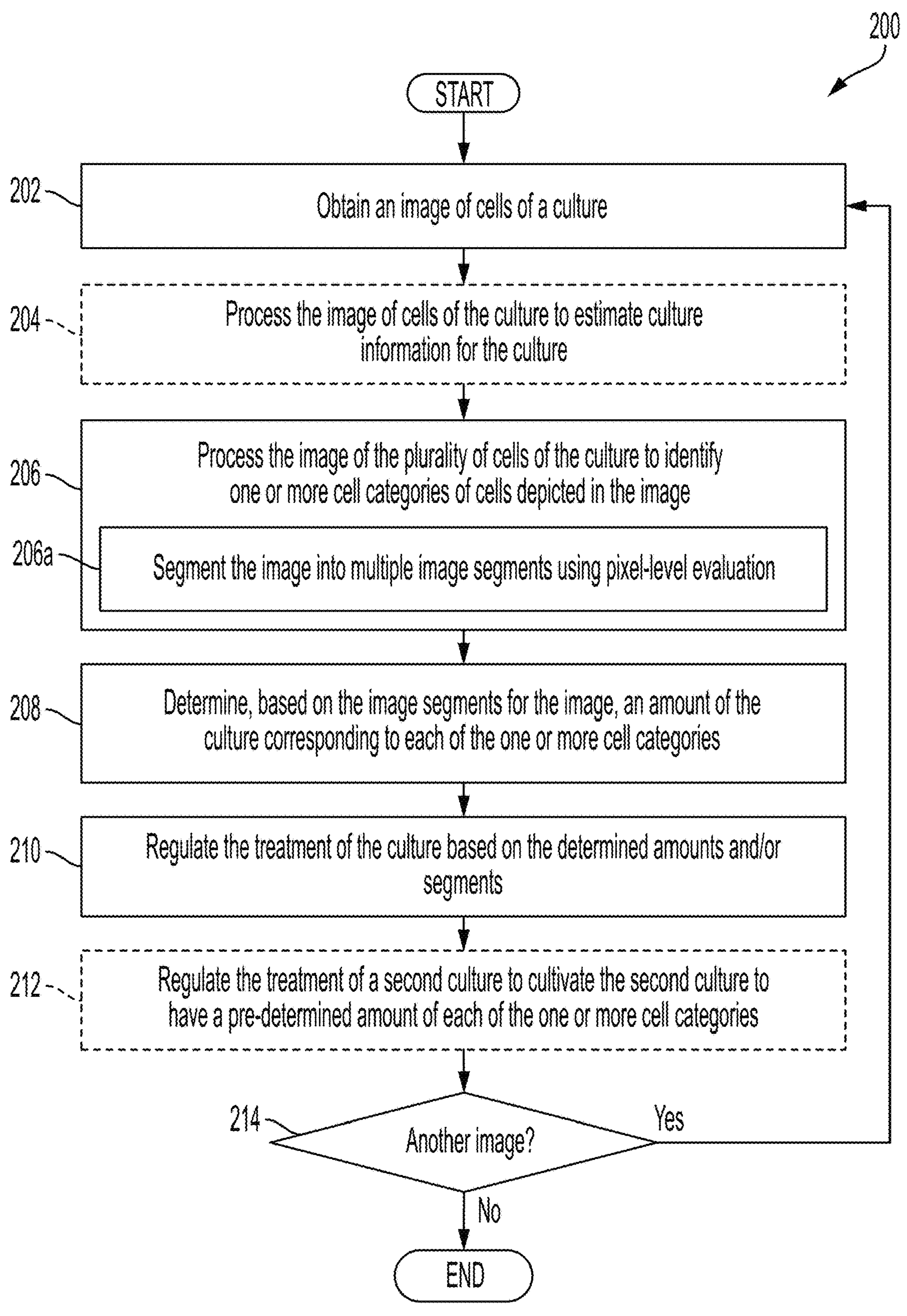
FIG. 2A is a flowchart of an illustrative process 200 for regulating treatment of a culture of cells, according to some embodiments of the technology described herein.

FIG. 2A is a flowchart of an illustrative process 200 for regulating treatment of a culture of cells, according to some embodiments of the technology described herein. One or more acts of process 200 may be performed automatically by any suitable computing device(s). For example, the act(s) may be performed by a laptop computer, a desktop computer, one or more servers, in a cloud computing environment, computing device(s) 180 as described herein with respect to FIG. 1B, computer system 1500 as described herein with respect to FIG. 15, and/or in any other suitable way. For example, in some embodiments, act 202 may be performed automatically by any suitable computing device(s). As another example, act 204 may be performed automatically by any suitable computing device(s).

Process 200 begins at act 202 where an image of cells of a culture is obtained. In some embodiments, the image is obtained using one or more image sensors. In some embodiments, the image is obtained from a data store storing images previously obtained using one or more image sensors. The one or more image sensors may include any suitable type of image sensor, as aspects of the technology are not limited to any particular type of image sensor. For example, the one or more image sensors may include a camera configured to capture a brightfield, phase contrast, and/or fluorescence image of cells of a culture. The camera may be included in a microscope imaging system. Example imaging systems are described herein including at least with respect to FIGS. 1A-1B.

Figure 4A:
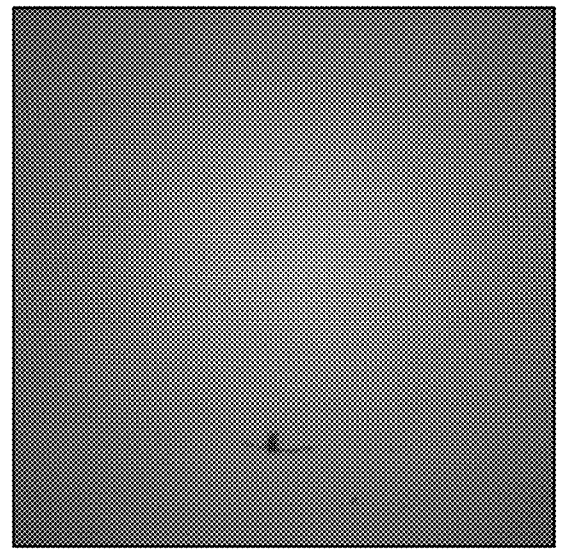
FIG. 4A shows an example brightfield image of a cell culture, according to some embodiments of the technology described herein.

In some embodiments, the obtained image depicts a portion (e.g., some or all) of the culture of cells. For example, the image may depict one, some, or all of the cells of the culture. FIG. 4A shows an example brightfield image of cells of a culture that may be obtained at act 202. However, it should be appreciated that the image may be captured using any suitable imaging modality, such as, for example, using brightfield, phase contrast, and/or fluorescence imaging.

Figure 4B:
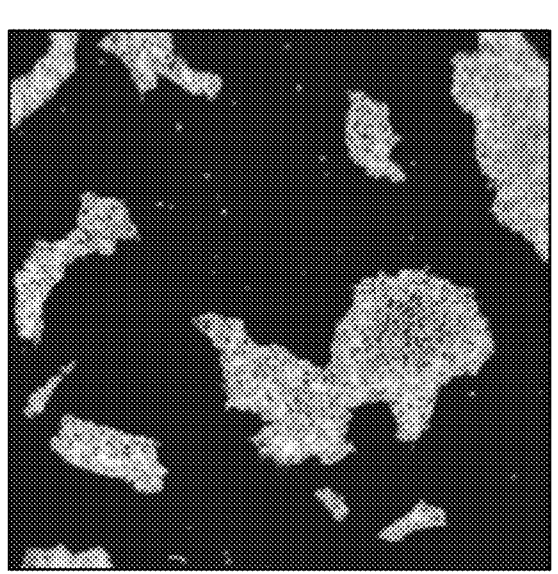
FIG. 4B shows an example density map generated for the cell culture shown in FIG. 4A, according to some embodiments of the technology described herein.

Process 200 then proceeds to (optional) act 204 where the obtained image is processed to estimate culture information for the culture. In some embodiments, processing the image includes providing the image as input to a trained machine learning model. The machine learning model may be trained for one or more tasks. For example, the machine learning model may be trained to estimate the number of cells in the image. Additionally, or alternatively, the machine learning model may be trained to estimate a density map in which density is distributed along x- and y-coordinates of the image. In some embodiments, the predicted cell count is used to inform density map estimation. FIG. 4B shows an example density map estimated for the brightfield image shown in FIG. 4A.

The machine learning model may be of any suitable type. For example, the machine learning model may be a neural network, such as a convolutional neural network (CNN) model. The CNN model may have one or more convolutional layers. For example, the CNN may use the architecture described in Sindagi, V. A. and Patel, V. M. J. "CNN-based Cascaded Multi-task Learning of High-level Prior and Density Estimation for Crowd Counting." arXiv: 1707.09605 (2017), which is incorporated by reference herein in its entirety.

In some embodiments, the culture information includes the output of the machine learning model. For example, the culture information may include the predicted cell count. Additionally, or alternatively, the culture information may be indicative of the physical location of the cells depicted in the image. For example, the culture information may include the density map estimated by the machine learning model. Additionally, or alternatively, the culture information may indicate coordinates of cells in the image.

Process 200 then proceeds to act 206 where the image is processed to identify one or more cell categories of cells depicted in the image. In some embodiments, processing the image includes, at act 206*a*, includes segmenting the image into one or more image segments. This may include, for example, providing the image as input to a trained machine learning model.

In some embodiments, the machine learning model is trained to predict, for each of multiple (e.g., some or all) pixels in the image, a value corresponding to respective cell categories. For example, a value corresponding to a respective cell category may indicate the likelihood that the pixel corresponds to a cell of respective cell category. As non-limiting examples, the machine learning model may be trained to predict a value indicating the likelihood that a pixel is associated with a cell of a particular cell type, that a pixel is associated with a cell or group of cells having a particular characteristic, that a pixel is associated with a cell having a particular differentiation status, that a pixel is associated with a cell at a particular stage of a cell cycle, and/or that a pixel is associated with a cell or group of cells belonging to a particular experimental group. Further examples of cell categories are described above.

In some embodiments, the culture information obtained at act 204 is optionally provided as input to the machine learning model at act 206*a*. Coordinate information from the estimated density map may be used to indicate predicted cell locations in the image. For example, a matrix of x- and y-coordinates, along with the image, may be provided as input to the trained machine learning model. Additionally, or alternatively, the coordinates may be used to directly label the image prior to providing the image to the machine learning model. In some embodiments, the machine learning model is trained to predict, for each of multiple pixels in the image, a value indicating the likelihood that a cell is present at a location associated with the pixel.

The machine learning model may be of any suitable type. For example, the machine learning model may be a neural network, such as a deep neural network model. The deep neural network may have any of numerous types of architectures and may comprise any suitable type of layer. For example, the deep neural network model may include a convolutional neural network (CNN), a U-Net, DeepLab and versions thereof (e.g., DeepLabv1, DeepLabv2, DeepLabv3, and DeepLabv3+), or any other suitable deep learning network. The neural network may have one or more convolutional layers. The architecture of the deep neural network may include one or more base blocks implemented using ResNet, MobileNet, Xception, or any other suitable deep learning networks may be used. Aspects of DeepLab are described in Chen, Liang-Chieh et al. "DeepLab: Semantic Image Segmentation with Convolutional Nets, Atrous Convolution, and Fully Connected CRFs." IEEE Transactions on Pattern Analysis and Machine Intelligence, vol. 40, no. 4, pp. 834-848 (2017), and in Chen, Liang-Chieh et al. "Encoder-decoder with atrous separable convolution for semantic image segmentation." In: Ferrari, V., Hebert, M., Sminchisescu, C., Weiss, Y. (eds.) ECCV 2018. LNCS, vol. 11211, pp. 833-851. Springer, Cham (2018), each of which is incorporated by reference herein in its entirety. Aspects of ResNet are described in He, K. et al. "Deep Residual Learning for Image Recognition." CVPR (2016), which is incorporated by reference herein its entirety.

Figure 3A:
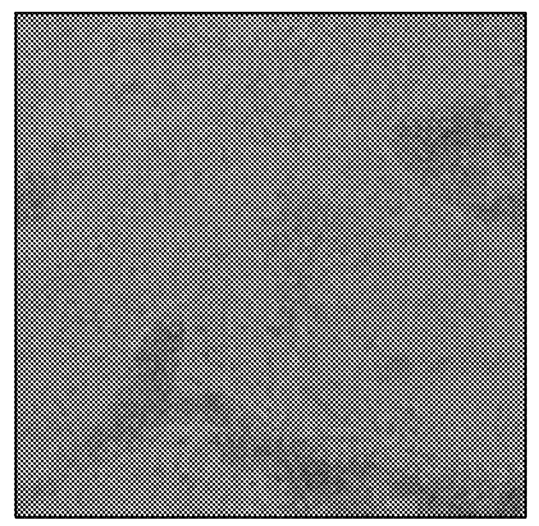
FIG. 3A shows an example segmented image of a cell culture, according to some embodiments of the technology described herein.
Figure 3A:
Figure 3B:
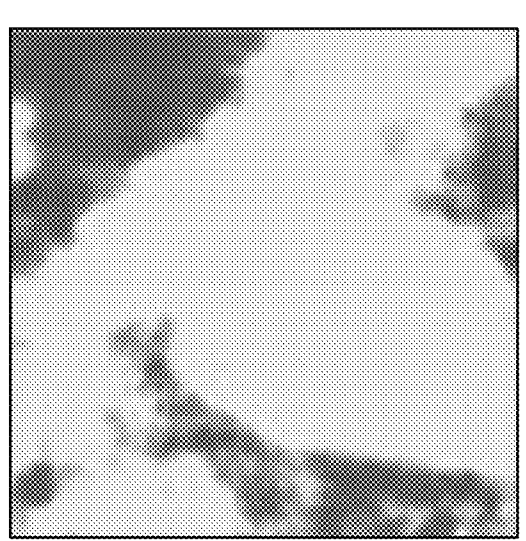
FIG. 3B shows an example segmented image for one cell category of the cell culture shown in FIG. 3A, according to some embodiments of the technology described herein.

FIG. 3A shows an example image segmentation output from a machine learning trained for image segmentation (e.g., model 108-1 in FIG. 1A). The image was segmented into segments comprising pixels associated with cells of three cell categories: iPSC, non-IPSC, and background. FIG. 3B shows the same image indicating the likelihood that a pixel is associated with a cell of the cell category of iPSC.

Process 200 then proceeds to act 208 where the image segments are used to determine an amount of the culture corresponding to each of one or more cell categories. For a particular cell category, in some embodiments, this includes determining the number of pixels associated with the cell category as compared to the total number of pixels and/or the number of pixels associated with one or more particular cell categories. For example, to determine the amount of a culture corresponding to iPSCs, the number of pixels associated with iPSCs may be compared to the sum of the number of pixels associated with iPSCs and the number of pixels associated with non-iPSCs.

Process 200 then proceeds to act 210 where treatment of the culture is regulated based on the amount of the culture corresponding to each of the one or more cell categories. In some embodiments, this includes outputting a recommendation for regulating treatment of the culture. Nonlimiting examples of recommendations include modifying the manner in which one or more materials are added to the culture, discarding the culture, passaging cells of the culture, and harvesting cells for downstream applications. Example recommendations for regulating treatment of a culture are described herein including at least with respect to FIG. 2C.

In some embodiments, regulating the treatment of the culture is performed by one or more user(s). For example, recommendations for regulating treatment of the culture may be output to the user(s) via a user interface, such as the user interface module 170 described herein including at least with respect to FIG. 1B.

In some embodiments, regulating the treatment of the culture is performed by an automatic or semi-automatic system. The system may include one or more components for performing the regulation, such as a robotic system (e.g., robotic system(s) 196 shown in FIG. 1B), an incubator (e.g., incubator 194 shown in FIG. 1B), and/or one or more imaging sensors (e.g., imaging sensor(s) 192 shown in FIG. 1B). In some embodiments, the system performs the regulation in response to determining the amount of the culture corresponding to each of the one or more cell categories, after a specified time has elapsed since the determination, and/or in response to receiving user input.

In some embodiments, regulating treatment of the culture is further based on culture information estimated at act 204. For example, the image segments may indicate one or more cells or groups of cells associated with a particular cell category. The manner of regulating the treatment of cells associated with that particular cell category may differ from the manner of regulating the treatment of cells associated with other categories. In some embodiments, the culture information may be used to precisely locate and treat cells corresponding to pixels associated with the particular cell category. For example, when removing differentiated cells from a culture, the image segments, together with the culture information, can be used to locate and remove cells corresponding to pixels associated with the differentiated cell category.

Process 200 then proceeds to (optional) act 212, where treatment of a second culture is regulated. In some embodiments, the second culture is being grown in parallel to the culture undergoing analysis (referred to herein as the first culture). For example, cells from both cultures may have been seeded at the same time or within a same window of time. In some embodiments, cells of the second culture can be seeded at a later time than cells of the first culture or after analysis of the first culture.

In some embodiments, treatment of the second culture is regulated at act 212 to cultivate the second culture to have a pre-determined amount of each of the one or more cell categories. This may include comparing the amount of the first culture corresponding to a particular cell category (determined at act 208) to the respective pre-determined amount. If the determined amount of the first culture equals the pre-determined amount or is within a threshold percentage of the pre-determined amount (e.g., 1%, 2%, 5%, 10%, etc.), then treatment of the second culture may be regulated in the same or a similar manner as the first culture. If the determined amount of the first culture does not equal the pre-determined amount or does not fall within the threshold percentage of the pre-determined amount, then treatment of the second culture may be regulated in a manner different from the first culture. The pre-determined amount can be any number of cells set by one or more users, by an automatic system, and/or by a semi-automatic system. In some embodiments, the pre-determined amount can be at least 1 cell, 10 cells, 100 cells, 1000 cells, 10,000 cells, 100,000 cells or more. In some embodiments, the pre-determined amount can be at most 100,000 cells, 10,000 cells, 1000 cells, 100 cells, 10 cells or less. In some other embodiments, the predetermined amount can be between 17,000 and 23,000 cells, between 17,500 and 22,500 cells, between 18,000 and 22,000 cells, between 18,500 and 21,500 cells, between 19,000 and 21,000 cells, between 19,500, and 20,500 cells, between 19,700 and 20,300 cells, between 19,800 and 20,200 cells, between 19,900 and 20,100 cells, between 19,950 and 20,050 cells, or within any other suitable range of cell numbers. Additionally, or alternatively, in some embodiments, the pre-determined amount can be any percentage of cells set by one or more users, by an automatic system, and/or by a semi-automatic system. In some embodiments, the pre-determined amount can be at least 10% of the cells of the culture, at least 20% of the cells of the culture, at least 25% of the cells of the culture, at least 30% of the cells of the culture, at least 40% of the cells of the culture, at least 50% of the cells of the culture, at least t60% of the cells of the culture, at least 70% of the cells of the culture, at least 75% of the cells of the culture, at least 80% of the cells of the culture, at least 90% of the cells of the culture, at least 95% of the cells of the culture, between 10% and 100% of the cells of the culture, between 50% and 100% of the cells of the culture, between 75% and 95% of the cells of the culture, or within any other suitable range. Nonlimiting examples of recommendations for regulating treatment of the second culture include modifying the manner in which one or more materials are added to the culture, discarding the culture, passaging cells of the culture, and harvesting cells for downstream applications. Example recommendations for regulating treatment of a culture are described herein including at least with respect to FIG. 2C.

As described herein, including at least with respect to act 210, regulating treatment of the second culture may be performed by one or more users, by an automatic system, and/or by a semi-automatic system.

At act 214, process 200 includes determining whether there is another image of the cells of the culture to be processed. When it is determined that there is another image, acts 202-212 are repeated for the other image.

It should be appreciated that any combination of acts may be performed as part of process 200. Process 200 may include additional or fewer acts than those shown in FIG. 2A. For example, process 200 may include acts 202-214, acts 206-210, acts 202 and 206-210, acts 204-210, acts 202-210, etc.

Figure 2B:
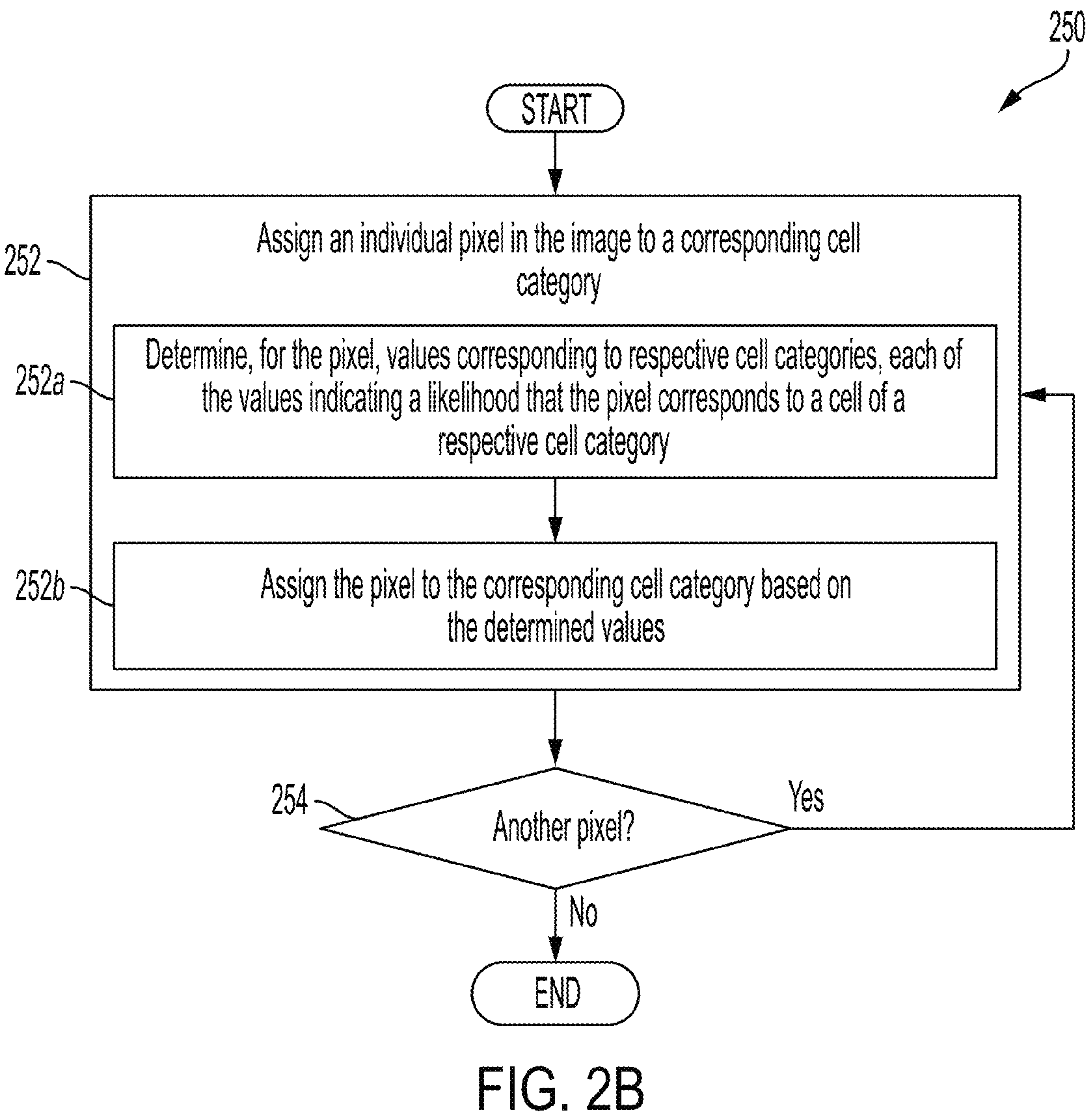
FIG. 2B is a flowchart of an illustrative process 250 for segmenting an image into multiple image segments, according to some embodiments of the technology described herein.

FIG. 2B is a flowchart of an illustrative process 250 for segmenting an image into multiple image segments, in accordance with some embodiments of the technology described herein. In some embodiments, act 206*a* of process 200 may be implemented using process 250. Process 250 may be performed by any suitable computing device(s) (e.g., computing device(s) 180 as described herein with respect to FIG. 1B and/or computer system 1500 described herein with respect to FIG. 15).

Process 250 begins at act 252, where a pixel in the image is assigned to a corresponding cell category. As nonlimiting examples, this may include assigning a pixel to a cell category representing a type of a cell or group of cells, assigning a pixel to a cell category representing a characteristic of a cell or group of cells, assigning the pixel to a cell category representing a differentiation status of a cell, assigning the pixel to a cell category representing a particular stage of a cell cycle, and/or assigning the pixel to a cell category representing an experimental group to which a cell or group of cells belongs. Further examples of cell categories are described above.

In some embodiments, act 252 includes assigning a pixel to multiple corresponding cell categories. This may include assigning a pixel to any corresponding combination of cell categories. For example, this may include assigning a pixel to a cell category representing a particular cell type and to a cell category representing a characteristic of a cell. As another example, this may include assigning a particular cell type to a cell category representing a differentiation status, to a cell category representing a cell cycle stage, and to a cell category representing a characteristic of a group of cells.

Assigning an individual pixel in the image to a corresponding cell category at act 252 includes, at act 252*a*, determining, for the pixel, values corresponding to respective cell categories. In some embodiments, the values indicate the likelihood that the pixel corresponds to a cell of the respective cell category. For example, this may include determining, for a pixel, a first value indicating the likelihood that the pixel is associated with a cell of a first cell type (e.g., an iPSC) and a second value indicating the likelihood that the pixel is associated with a cell of a second type (e.g., a non-iPSC). However, it should be appreciated that any suitable number of values may be determined for the pixel (e.g., 2 values, 3 values, 4 values, 5 values, 10 values, 20 values, etc.).

In some embodiments, act 252*a* is performed using a machine learning model, such as the machine learning model described herein including at least with respect to act 206 of process 200. For example, the determined values may be obtained as output from the machine learning model.

Process 250 then proceeds to act 252*b*, where the pixel is assigned to the corresponding cell category based on the determined values. In some embodiments, this includes assigning the pixel to the cell category corresponding to the value indicating the greatest likelihood that the pixel is associated with a cell of that category. For example, for a value indicating a 40% likelihood that the pixel is associated with a cell of Type A and a value indicating a 60% likelihood that the pixel is associated with a cell of Type B, Type B may be assigned to the pixel since it corresponds to the value indicating the greatest likelihood.

In some embodiments, regardless of the cell category assigned to the pixel at act 252*b*, values corresponding to each cell category may be output. For example, for a particular pixel, the output may indicate that the value indicating the likelihood that the pixel is associated with a cell of Type A is 40% and the value indicating the likelihood that the pixel is associated with a cell of Type B is 60%, even though the pixel may be assigned to Type B. In this way, the techniques may be used to monitor cells in the culture as they transition between cell categories. For example, the techniques may be used to determine whether the cells are transitioning between an undifferentiated and differentiated state. While pixels corresponding to those cells may be classified as "undifferentiated," the value indicating the likelihood that the pixel is associated with undifferentiated cells may be relatively low (e.g., 51%, 55%, 60%, etc.) relative to the differentiated category, which may indicate that the cells are transitioning to a differentiated state. Accordingly, it may be possible to regulate treatment of the culture to assist in this transition and/or to prevent this transition. Examples of regulating treatment of a culture are described herein including at least with respect to FIG. 2C.

At act 254, process 250 includes determining whether there is another pixel. When it is determined that there is another pixel, acts 252-254 are repeated for the other pixel.

Figure 2C:
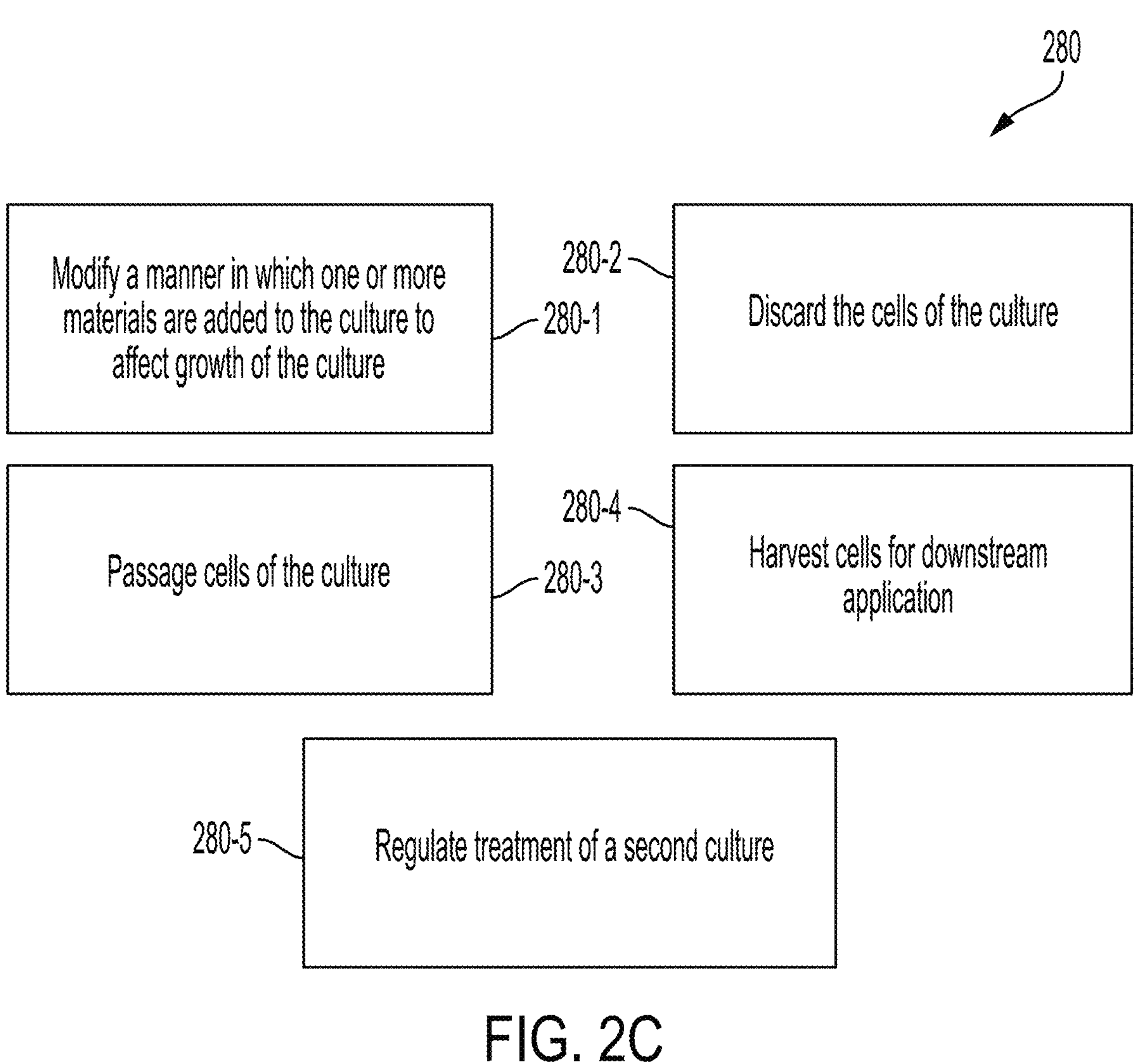
FIG. 2C shows examples of regulating the treatment of a culture based on identified image segments, according to some embodiments of the technology described herein.

FIG. 2C shows examples 280 of regulating the treatment of a culture based on identified image segments. It should be appreciated that while FIG. 2C shows examples, embodiments of the technology described herein are not limited to any particular manner of regulating treatment of the culture.

Example 280-1 includes modifying the manner in which one or more materials are added to the culture to affect growth of the culture.

In some embodiments, modifying the manner in which one or more materials are added to the culture includes modifying the types of materials added to the culture. For example, modifying the types of materials added the culture may include adding serum, inorganic salts, buffer, carbohydrates, amino acids, vitamins, proteins, peptides, fatty acids, lipids, trace elements, antibiotics, and/or growth factors. Example materials are described at least in Chen, G. et al. "Chemically defined conditions for human iPSC derivation and culture." Nat. Methods. 2011; 8(5): 424-429, which is incorporated by reference herein in its entirety. In some embodiments, the materials differ based on the types of cells being cultured and/or based on the cell fate of undifferentiated stem cells in the culture.

In some embodiments, modifying the manner in which one or more materials are added to the culture includes modifying the rate at which the materials are added. This may include increasing or decreasing the rate at which particular materials are added, and/or calculating the rate at which the materials can be added.

In some embodiments, modifying the manner in which one or more materials are added to the culture includes modifying the amount of the materials that are added. This may include, for example, increasing or decreasing the amount of the one or more materials that are added to the culture, and/or quantifying the amount of the materials that can be added.

As a nonlimiting example, maintaining iPSCs in an undifferentiated state involves adding materials, such as growth factors, to the culture at specified time intervals. If the iPSCs begin to differentiate, then the type, amount, or rate at which the materials are added may be modified. In some embodiments, the techniques described herein, including at least with respect to processes 200 and 250, can be used to determine the presence and/or the relative amount of the culture that is in a differentiated state. The presence and/or amount of differentiation can be used to inform whether to add different materials, the amount of the materials that can be added, and the rate at which they can be added to prevent further differentiation and to maintain the iPSCs in their undifferentiated state. For example, if the amount of the culture associated with a non-iPSC cell category (as compared to the amount associated with an iPSC cell category) exceeds 5%, exceeds 10%, exceeds 15%, exceeds 20%, exceeds 25%, or exceeds 30% then the manner in which materials are added may be adjusted. For example, adjusting the manner in which materials are added may include increasing the amount of fibroblast growth factor 2 (FGF2) in the culture.

As another example, iPSCs can be differentiated into different cell types by monitoring the cell culture and controlling the cell culture environment. For example, iPSCs can be differentiated towards forebrain. Forkhead Box G1 (FOXG1) is a forebrain marker and inhibition of WNT signaling has been shown to improve FOXG1 induction. In some embodiments, the techniques described herein, including at least with respect to processes 200 and 250, can be used to determine the amount of a culture corresponding to a FOXG1 marker cell category. For example, the techniques may be used to process an image of the culture after it has been stained for FOXG1 to determine, for pixels in the image, the likelihood that the pixel is associated with a FOXG1 marker cell category. If the amount of the culture corresponding to the FOXG1 marker cell category is less than a threshold amount, then XAV939, a WNT inhibitor, may be added to the culture to improve FOXG1 induction. Examples of neural differentiation are described by Maroof, et al. "Directed differentiation and functional maturation of cortical interneurons from human embryonic stem cells." Cell Stem Cell. 2013; 12(5): 559-572, which is incorporated by reference herein in its entirety.

Example 280-2 includes discarding cells of the culture. In some embodiments, discarding cells of the culture includes discarding one, some, or all of the cells of the culture. In some embodiments, cells may be discarded if they are associated with one or more pre-determined cell categories or if a certain amount of the culture is associated with one or more pre-determined cell categories. For example, if an amount of the culture associated with a pre-determined cell category exceeds a threshold, then the culture may be discarded. Additionally, or alternatively, cells corresponding to pixels associated with the pre-determined cell category may be discarded. As a nonlimiting example, the pre-determined cell category may comprise a non-iPSC call category, and a culture may be discarded if the amount of a non-iPSC cell category (as compared to the amount associated with an iPSC cell category) exceeds 5%, exceeds 10%, exceeds 15%, exceeds 20%, exceeds 25%, or exceeds 30%, then the culture may be discarded. Additionally, or alternatively, the non-iPSCs may be identified and discarded.

In some embodiments, discarding the cells of the culture includes discarding the culture when it is has a lower quality than other cultures. For example, a well plate may have several wells (e.g., two or more), each of which contains a culture. In some embodiments, a user and/or an automated system may rank the cultures (e.g., using techniques described herein). If a culture is not ranked high enough, then the culture may be discarded. For example, on a plate having 96 wells, 10 of the cultures may be selected for further growth, while the remaining cultures may be discarded.

Example 280-3 includes passaging cells of the culture. Passaging of cells is a procedure in which cells of a culture are divided (or split) into new cultures to facilitate further expansion.

In some embodiments, regulating passaging of the culture includes determining when to split the culture, determining the number of new cultures into which to split the culture, and/or determining whether the culture is overgrown and can be discarded. In some embodiments, these decisions may depend on one or more factors such as, for example, the number of cells in the culture, the conditions used for maintaining a cell type, differentiation protocols, the number of downstream assays, and type of downstream assays. The number of cells in the culture may be determined, for example, using the techniques described herein including at least with respect to act 204 of process 200.

In some embodiments, the culture is ready to split when the number of cells equals a pre-determined number or is approximately equal (e.g., within 1%, 2%, 3%, 5%, 7%, 10% etc.) to the pre-determined number. The pre-determined number can be any number of cells set by one or more users, by an automatic system, and/or by a semi-automatic system. For example, the techniques may include determining that a culture is ready to split when the number of cells in the culture is between 17,000 and 23,000 cells, between 17,500 and 22,500 cells, between 18,000 and 22,000 cells, between 18,500 and 21,500 cells, between 19,000 and 21,000 cells, between 19,500, and 20,500 cells, between 19,700 and 20,300 cells, between 19,800 and 20,200 cells, between 19,900 and 20,100 cells, between 19,950 and 20,050 cells, or within any other suitable range of cell numbers.

In some embodiments, the culture is overgrown and can be discarded when the number of cells exceeds a threshold amount. For example, the techniques may include determining that a culture is overgrown and can be discarded when the number of cells in the culture exceeds 23,000 cells, 23,500 cells, 24,000 cells, 24,500 cells, 25,000 cells, 25,500 cells, 26,000 cells, 26,500 cells, 27,000 cells, or any other suitable number of cells.

In some embodiments, the techniques can be used to determine the number of new cultures into which to split the cells based on the growth rate of cells in the culture. For example, cells growing at faster rates may be split into a greater number of new cultures. By monitoring the number of cells in the culture over time (e.g., by analyzing images captured over time), the growth rate can be quantified and used to inform the split ratio.

Example 280-4 includes harvesting the cells for downstream applications. In some embodiments, harvesting the cells includes monitoring and/or guiding cellular differentiation. For example, this may include determining when to differentiate the cells and/or whether differentiation was successful.

As a first example, cardiomyocytes have morphologies that are indicative of mature, healthy cardiomyocytes. In particular, organized cardiomyocyte sarcomeres are indicative of mature and healthy cardiomyocytes, while disorganized cardiomyocyte sarcomeres are indicative of immature and unhealthy cardiomyocytes. In some embodiments, the image segmentation techniques described herein, including at least with respect to FIGS. 2A-2B, can be used to identify pixels associated with sarcomeres and pixels associated with non-sarcomeres. The resulting image segments can be used to determine whether the sarcomeres are organized (e.g., based on user observation and/or using one or more computing devices). If the sarcomeres are determined to be organized, then the culture may be identified as having successfully differentiated and may be used for downstream experiment. If the sarcomeres are determined to be disorganized, then the culture may be identified as having unsuccessfully differentiated and may not be used for downstream experiments.

As another example, the clustering of cells can be used to determine when the cells can be differentiated. As referred to herein, a cluster of cells may include a group of two or more cells in contact with one another. In some embodiments, the clustering of cells is determined using the techniques described herein including at least with respect to acts 204 and 206 of process 200. For example, an estimated density map can be used to predict the locations of cells in the dish, which can in turn be used to determine whether the cells have formed clusters. Additionally, or alternatively, image segments can be used to identify clusters by identifying pixels associated with cells versus pixels associated with non-cells.

In some embodiments, determining that cells are ready for differentiation includes determining whether the amount of the culture corresponding to cell clusters compared to the amount of the culture corresponding to non-clusters exceeds a threshold. For example, this may include determining whether the amount of culture corresponding to clusters exceeds at least 40%, at least 45%, at least 50%, at least 55%, at least 60%, at least 65%, at least 70%, or any other suitable threshold proportion (e.g., fraction or percentage) of the culture. If the amount exceeds the threshold, then the cells may be identified as being ready for differentiation. If the amount does not exceed the threshold, then the cells may be identified as not being ready for differentiation.

As yet another example, regulating treatment of a culture may include selecting cells and/or cultures for downstream analyses. In some embodiments, this includes selecting cultures of cells having a particular growth rate, having an absence of one or more markers, having a presence of one or more markers, having an absence of debris, having an absence of necrosis, and/or having a particular level of target expression.

Determining whether cells have a particular growth rate may include, for example, monitoring the number of cells in a culture over time. In some embodiments, determining the number of cells in a culture includes using the techniques described herein including at least with respect to act 204 of process 200. In some embodiments, a culture is selected for downstream analyses if the number of cells in the culture equals or exceeds the number of cells in other cultures at a particular time interval.

Determining whether cells of the culture include a particular marker includes identifying, in an image of the culture, pixels associated with the marker. In some embodiments, identifying pixels associated with a marker includes using the image segmenting techniques described herein including at least with respect to act 206 of process 200 and with respect to process 250. For example, an image of the culture may be provided to a machine learning model trained to predict, for each of multiple pixels in the image, the likelihood that the pixel is associated with the marker. In some embodiments, a culture is selected for downstream analysis if one or more particular markers are present or absent in the sample. In some embodiments, a culture is selected for downstream analyses if the amount of a particular marker in a culture exceeds or is less than a threshold amount.

For example, SSEA-3 and SSEA-4 are markers that are associated with pluripotency. Accordingly, a culture may be monitored for SSEA-3 and SSEA-4 in order to maintain iPSCs in the culture. For example, in some embodiments, an image may be obtained for a culture stained for SSEA-3 and SSEA-4. The image may be processed using the techniques described herein, including at least with respect to processes 200 and 250, to determine, for pixels in the image, the likelihood that each pixel is associated with an SSEA-3 and/or SSEA-4 marker cell category. If the amount of the culture associated with the SSEA-3 and/or SSEA-4 marker cell category is below a threshold amount or is less than a previously-determined amount, then FGF may be added to the cell culture to maintain the cells in an undifferentiated state and in an effort to increase SSEA-3 and SSEA-4.

Similarly, in some embodiments, determining cell viability of a culture (e.g., whether the culture includes debris and/or necrosis) includes identifying, in an image of the culture, pixels associated with debris and/or necrosis. In some embodiments, identifying pixels associated with debris and/or necrosis includes using image segmentation techniques described herein including at least with respect to act 206 of process 200 and with respect to process 250. For example, an image of the culture may be provided to a machine learning model trained to predict, for each of multiple pixels in the image, the likelihood that the pixel is associated with debris and/or the likelihood that the pixel is associated with necrosis. In some embodiments, the culture is selected for downstream analyses if the culture does not include debris and/or necrosis. In some embodiments, the culture is selected for downstream analyses if the amount of the culture associated with debris and/or necrosis is less than a threshold amount.

In some embodiments, the level of target expression of cells of a culture is measured by fluorescence. For example, this may include determining an amount of the culture associated with fluorescence. In some embodiments, determining the amount of a culture associated with fluorescence includes identifying, in a fluorescence image of the culture, pixels associated with fluorescence using the techniques described herein including at least with respect to act 206 of process 200 and with respect to process 250. For example, a fluorescence image of the culture may be provided as input to a machine learning model trained to predict, for each of multiple pixels in the image, the likelihood that the pixel is associated with fluorescence. In some embodiments, if the amount of the culture associated with fluorescence exceeds a particular threshold, the culture may be selected for downstream analysis.

Example 280-5 includes regulating treatment of a second culture. For example, the second culture may include a future culture or a culture that is growing in parallel to the first culture. In some embodiments, regulating the treatment of the second culture includes making decisions about the second culture related to modifying the manner in which one or more materials are added to the second culture, discarding the second culture, passaging cells of the second culture, and/or harvesting cells for downstream applications.

As a first example, the techniques described herein may be used to monitor the growth rate of a cell culture. For example, process 200 described herein with respect to FIG. 2A may be used to determine the amount of the culture corresponding to cells and the amount of the culture corresponding to background (e.g., non-cells). The determined amounts may be used to determine the percent confluency. For example, when 80% of the culture is identified as corresponding to cells, then the culture may be considered 80% confluent.

In some embodiments, a cell culture may grow quickly and become overly confluent, resulting in damage to the cells (e.g., the cells may start dying off). For example, the cells may be damaged when the cell culture exceeds a threshold percent confluency (e.g., 75%, 80%, 85%, 90%, etc.). Accordingly, in some embodiments, the percent confluency may inform decisions relating to the treatment of the cell culture and/or the treatment of future culture(s). For example, if the percent confluency exceeds the threshold percentage and the cells are not recoverable, then the cell culture may be discarded. However, if the cells are recoverable, then the percent confluency may be used to inform decisions related to splitting the cells into one or more future cultures. For example, when the percent confluency exceeds the threshold percentage, this may indicate that the cells are growing quickly and that the cells can be split into a relatively large number of new cultures to accommodate this growth. Additionally, or alternatively, in some embodiments, the fast growth rate of the cells may indicate that the future cell cultures can be split at an earlier point in time to prevent them from becoming overly confluent.

As another example, a cell culture may have one or more pre-determined cells and/or conditions. In some embodiments, the presence of one or more pre-determined cells and/or conditions is used to inform decisions relating to the treatment of a future culture. The pre-determined cells and/or conditions can comprise any cells or conditions associated with any pre-determined cell cultures. For instance, if the predetermined cell cultures comprise a differentiated culture and an undifferentiated culture, then the pre-determined cells can comprise differentiated cells and undifferentiated cells. In some embodiments, the future culture may be treated in an effort to avoid one or more pre-determined cells and/or conditions (e.g., cell culture is overly confluent).

During growth of hematopoietic cells, for example, the cells become migratory and are prone to detachment. In some embodiments, the techniques described herein may be used to monitor the culture to determine an amount of the culture corresponding to detached cells. For example, process 200 described herein with respect to FIG. 2A may be used to determine an amount of the culture corresponding to a detached cell category, an amount of the culture corresponding to an attached cell category, and any other suitable category (e.g., a background cell category). The proportion of detached cells in the culture may be determined by comparing the amount of the culture corresponding to the detached cell category to the amount of the culture corresponding to the attached cell category.

To prevent such detachment, the cell culture dish may be coated using an attachment matrix. However, if the amount of the attachment matrix is insufficient, the cells may still detach. In some embodiments, if a determined proportion of detached cells exceeds a threshold, then the culture may be discarded. For example, if at least 45%, 50%, 55%, 60%, 70%, or any other suitable proportion of the culture corresponds to the detached cell category, then the culture may be discarded. This may indicate that the amount of attachment matrix coating can be increased for future cultures of hematopoietic cells to prevent such detachment.

As another example, during neural differentiation, the culture may be monitored for the presence of mesenchymal cells and/or neurons. In some embodiments, the techniques described herein may be used to monitor the culture to determine an amount of the culture corresponding to mesenchymal cells and/or neurons. For example, process 200 described with respect to FIG. 2A may be used to determine an amount of the culture corresponding to a mesenchymal cell category, an amount of the culture corresponding to a neuron cell category, and any other suitable category (e.g., a background cell category). The proportion of mesenchymal cells in the culture may be determined by comparing the amount of the culture corresponding to the mesenchymal cell category to the amount of the culture corresponding to the neuron cell category.

When the determined proportion of mesenchymal cells increases, this indicates that the neural differentiation was unsuccessful. In particular, in some embodiments, improper concentrations of SMAD inhibitors and/or fibroblast growth factors (FGFs) may result in unsuccessful neural differentiation. Therefore, the conditions of future cell culture(s) may be modified (e.g., by adjusting the concentrations of SMAD inhibitors and/or FGFs) to attain successful neural differentiation.

Additionally, or alternatively, in some embodiments, the relationship between the condition of one or more cultures and the quality of those cultures may be monitored to select conditions for future cultures. For example, neural differentiation may result in a high percentage (e.g., 90%, 95%, 97%, 98%, 99%, 100%, etc.) of neurons and a low percentage (e.g., 0%, 1%, 2%, 3%, 5%, 10%, etc.) of mesenchymal cells. In some embodiments, neural differentiation is attempted in cell cultures having different cell culture conditions (e.g., concentrations of SMAD inhibitors and/or FGFs). Accordingly, the different cultures may grow to have different proportions of neurons and mesenchymal cells. The relationship between the culture conditions and the corresponding proportions of neurons and mesenchymal cells may be used to select cell culture conditions for future cell culture(s) that will lead to a high proportion of neurons and a low proportion of mesenchymal cells. For example, the cell culture conditions, and the proportions of neurons and mesenchymal cells may be provided as input to a machine learning model trained to extrapolate the relationship between the two.

Figure 5A:
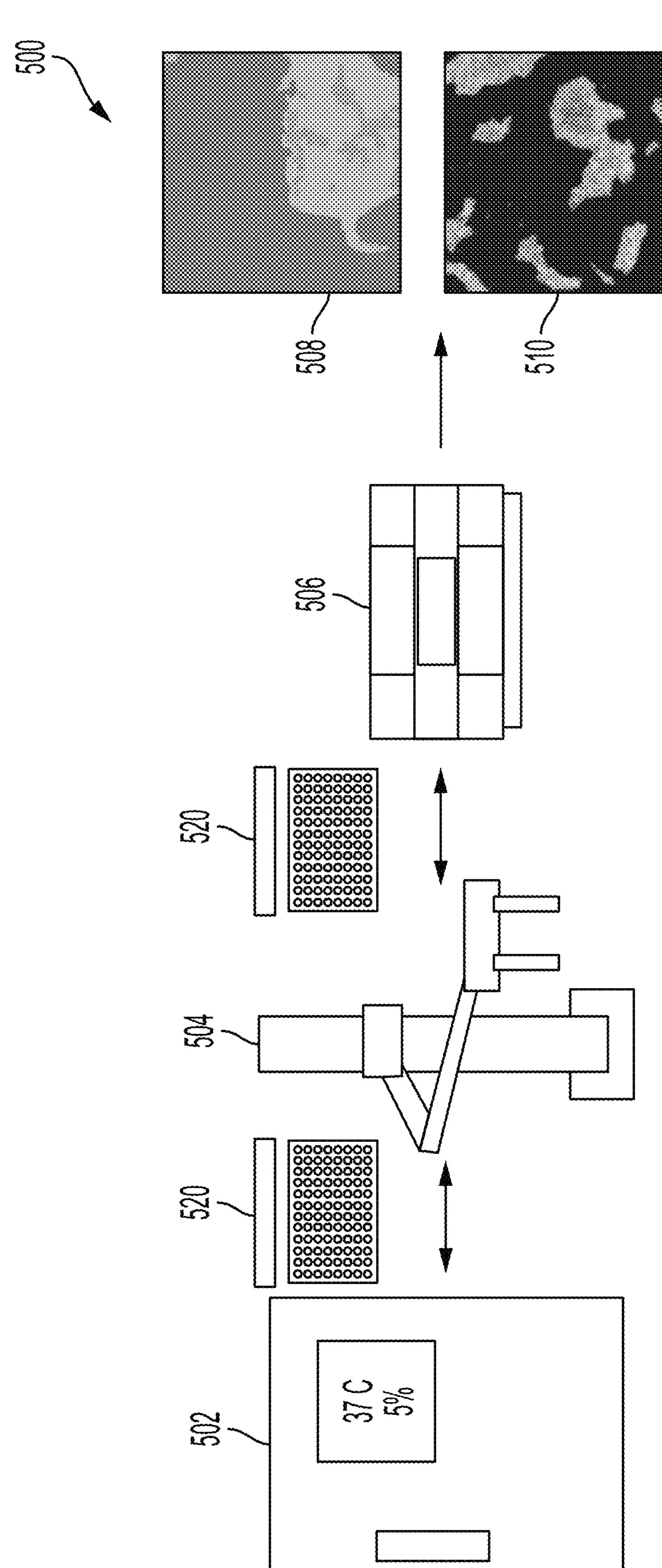
FIG. 5A shows an example cell imaging and incubation system, according to some embodiments of the technology described herein.

FIG. 5A shows an example cell imaging and incubation system, according to some embodiments of the technology described herein. In some embodiments, the example cell imaging and incubation system 500 includes an incubator 502, robotic system(s) 504, and/or an imaging system 506.

In some embodiments, the incubator 502 is configured to hold one or more cultures 520 of cells. The incubator 502 may automatically, semi-automatically, or manually regulate the environment in which the one or more cultures 520 are held. For example, the incubator 502 may include the incubator 194 described herein including at least with respect to FIG. 1B.

In some embodiments, the robotic system(s) 504 is configured to manipulate the one or more cultures 520 and/or other materials used for regulating treatment of the one or more cultures 520. As shown in FIG. 5A, the robotic system(s) 504 may be configured to move the one or more cultures 520 between the incubator 502 and the imaging system 506. For example, the robotic system(s) 504 may include the robotic system(s) 196 described herein including at least with respect to FIG. 1B.

In some embodiments, the imaging system 506 may include one or more imaging sensors configured to capture images of cells of the one or more cultures 520. For example, the imaging sensor(s) may be configured to capture any suitable type of image of the cells, such as a brightfield image, phase contrast image, and/or fluorescence image. For example, the imaging sensor(s) may include the imaging sensor(s) 192 described herein including at least with respect to FIG. 1B.

In some embodiments, the computing device (not shown) of the imaging and incubation system 500 is configured to process images obtained using the imaging system 506 to obtain image segments 508 and/or culture information 510. For example, the computing device may process the obtained image according to the techniques described herein including at least with respect to FIGS. 2A-2B.

In some embodiments, the imaging and incubation system 500 is a fully automatic or a semi-automatic system, meaning that it can automatically or semi-automatically (e.g., with user input) monitor a cell culture and regulate treatment of the cell culture to achieve a pre-determined outcome. Techniques for operating the example imaging and incubation system 500 are described herein including at least with respect to FIG. 5B.

Figure 5B:
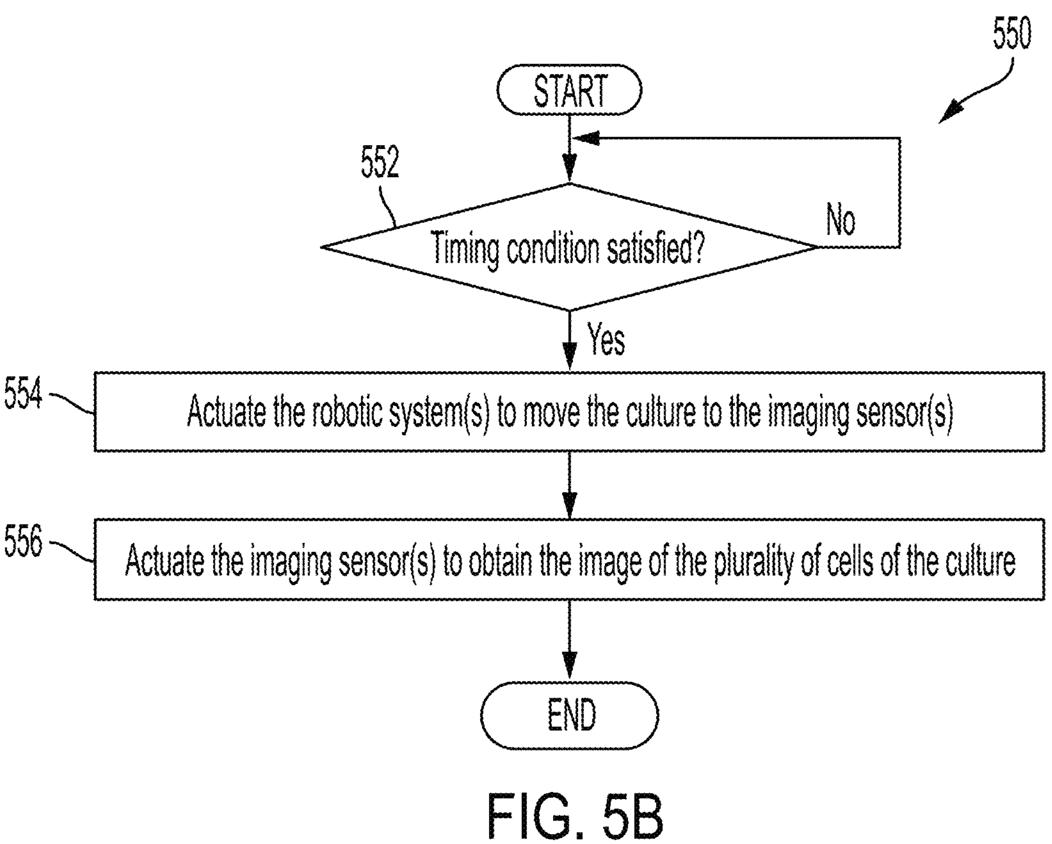
FIG. 5B is a flowchart of an illustrative process 550 for operating a cell imaging and incubation system, according to some embodiments of the technology described herein.

FIG. 5B is a flowchart of an illustrative process 550 for operating a cell imaging and incubation system, according to some embodiments of the technology described herein. One or more acts of process 550 may be performed automatically by any suitable computing device(s). For example, the act(s) may be performed by a laptop computer, a desktop computer, one or more servers, in a cloud computing environment, computing device(s) 180 as described herein with respect to FIG. 1B, computer system 1500 as described herein with respect to FIG. 15, and/or in any other suitable way.

At act 552, process 550 includes determining whether a timing condition has been satisfied. In some embodiments, determining whether the timing condition has been satisfied includes determining whether a particular amount of time has elapsed since an initial time (e.g., since cells were seeded in the culture). For example, this may include determining whether six hours, seven hours, eight hours, nine hours, ten hours, 11 hours, 12 hours, 13 hours, 14 hours, 16 hours, 17 hours, 18 hours, or any other suitable amount of time has elapsed since the cells were seeded in the culture, as aspects of the technology described herein are not limited in this respect.

In some embodiments, determining whether the timing condition has been satisfied includes determining whether a particular amount of time has elapsed since a previous image was obtained (e.g., using imaging system 506 shown in FIG. 5A) for the culture. For example, this may include determining whether six hours, seven hours, eight hours, nine hours, ten hours, 11 hours, 12 hours, 13 hours, 14 hours, 16 hours, 17 hours, 18 hours, or any other suitable amount of time has elapsed since the cells were seeded in the culture, as aspects of the technology described herein are not limited in this respect.

If the timing condition is satisfied at act 552, process 550 proceeds to act 554, where the robotic system is actuated to move the culture to the imaging sensor(s). For example, the culture may be stored in an incubator, and the robotic system may be actuated to move the culture from the incubator to the imaging system having the one or more imaging sensor(s). In some embodiments, software executing on a computing device (e.g., computing device(s) 180 in FIG. 1B) actuates the robotic system. For example, system automation module 162 in FIG. 1B may be configured to actuate the robotic system(s).

Process 550 then proceeds to act 556, where the one or more imaging sensor(s) are actuated to obtain an image of the plurality of cells of the culture. In some embodiments, the imaging sensor(s) are actuated in response to the positioning of the culture in the imaging system. For example, the imaging system may include one or more sensors (e.g., a presence detection sensor) configured to detect the presence of the culture in the imaging system. Additionally, or alternatively, feedback from the robotic system(s) may indicate that the robotic system(s) completed the task of moving the culture to the imaging sensor(s).

In some embodiments, the imaging sensor(s) are actuated after a timing condition has been satisfied. For example, determining whether the timing condition has been satisfied may include determining an amount of time that has elapsed since act 554 was initiated. In some embodiments, the timing condition depends on the configuration of the imaging and incubation system and/or the amount of time that it takes for the robotic system(s) to move the culture from the incubator to the imaging sensor(s).

In some embodiments, the imaging sensor(s) are actuated according to user input. For example, a user may specify a time for obtaining the image.

In some embodiments, the image obtained using the imaging sensor(s) may be processed according to the techniques described herein, including at least with respect to FIGS. 2A-2B.

In some embodiments, process 550 includes acts additional to or alternative to those shown in FIG. 5B. For example, the process 550 may further include, after act 556, actuating the robotic system(s) to move the culture away from the imaging sensor(s). For example, the robotic system(s) may be actuated to regulate treatment of the culture of cells according to the techniques described herein including at least with respect to FIGS. 2A-2C. Additionally or alternatively, the robotic system(s) may be actuated to move the culture back to the incubator.

EXAMPLES

Applications of iPSCs

Figure 6:
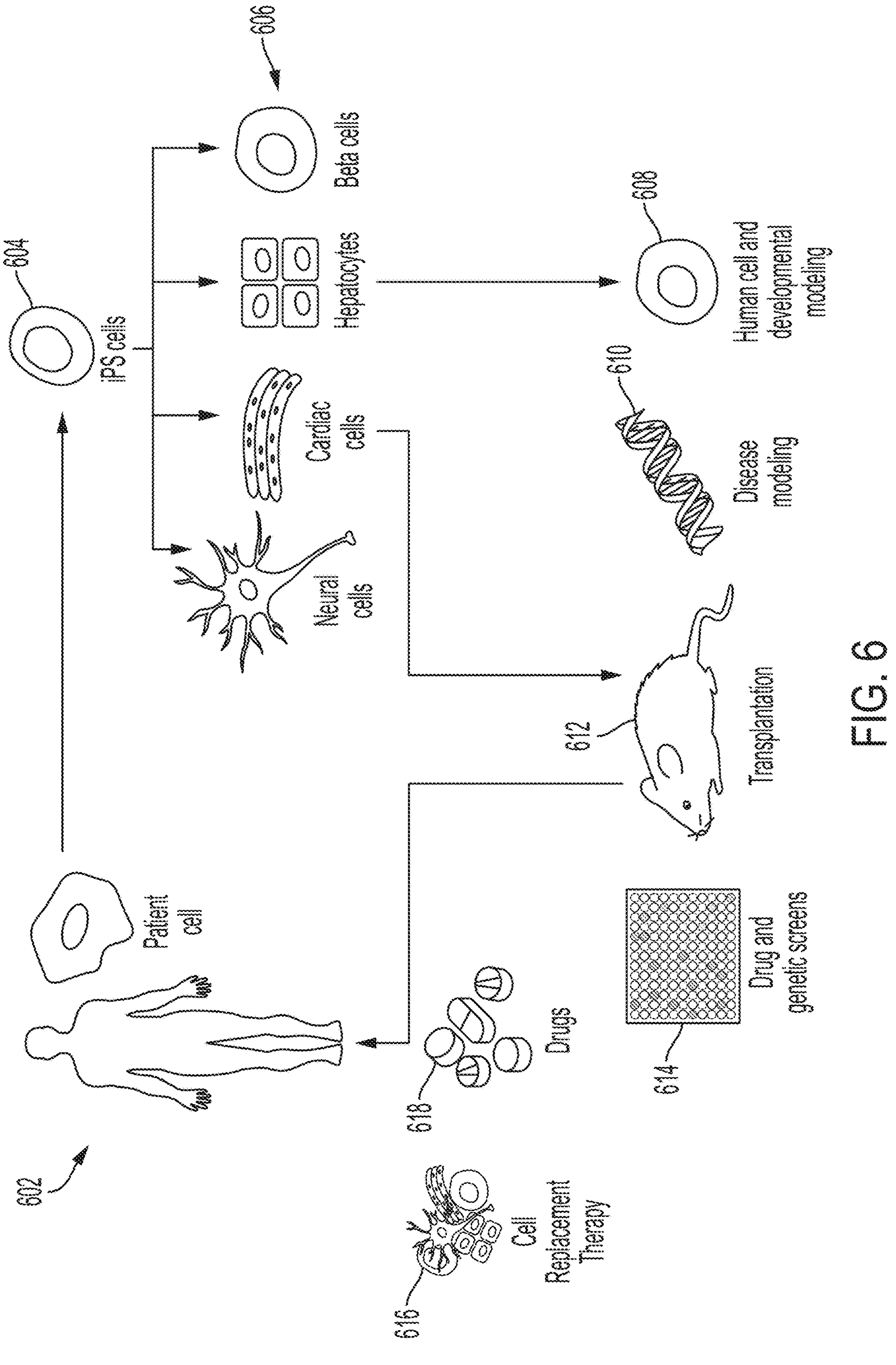
FIG. 6 shows an example process for generating and using induced pluripotent stem cells (iPSCs), according to some embodiments of the technology described herein.

FIG. 6 shows an example process for generating and using induced pluripotent stem cells (iPSCs), according to some embodiments of the technology described herein. As described herein, iPSCs 604 are a type of pluripotent stem cell derived from adult somatic cells (e.g., the patient's cell 602). iPSCs 604 have the ability to self-renew and to differentiate into (i.e., give rise to) many different cell types (e.g., cell types 606) that make up the adult human body. Accordingly, iPSCs 604 have many useful applications such as, for example, human cell and developmental modeling 608, disease modeling 610, transplantation 612, drug and genetic screening 614, cell replacement therapy 616, drug selection 618, cell-based assays, biochemical assays, target validation and de-orphaning, drug response prediction, molecular refinement, and quality assurance.

Example Automated Platform

An automated platform was assembled to monitor iPSC growth by integrating a robotic arm, automated incubator, imaging cytometer, and automation and control software. In particular, the automated platform included at least the following components: the PF3400 SCARA Robot by Precise Automation, the Cytomat™ Automated Incubator by Thermo Scientific™, the Celigo Image Cytometer by Nexcelom Bioscience, and the Overlord™ Laboratory Automation Software by Peak Analysis and Automation.

Example Culture Quality Evaluation Techniques

Experiments were performed to evaluate whether brightfield data could be used to determine culture quality and, more specifically, to detect differences in cell morphology due to differentiation. Six iPSC lines (or clones) were generated using the same methods, described herein including at least with respect to the section "Experimental Methods." The clones, named C2 through C7, were selected for their varying degree of apparently differentiated cells observed upon continued passaging. PluriTest (Muller et al., 2011), an unbiased bioinformatic method for accurately determining the pluripotency of human stem cells (Initiative, 2018) was used to establish a quality score and ranking for the individual clones. Bulk mRNA sequencing was performed on all seven clones, resulting in a PluriTest ranking from best to worst: LT, C7, C3, C4, C5, C6, C2. Aspects of PluriTest are described in Muller et al. "A bioinformatic assay for pluripotency in human cells." Nat. Methods. 8, 315-317 (2011), which is incorporated by reference herein in its entirety.

Different machine learning models were evaluated and selected for best accuracy in conducting three artificial intelligence (AI) tasks for determining clone quality: distinguishing between clones, classifying images as undifferentiated or differentiated, and semantic segmentation. The machine learning models evaluated include: Xception, Resnet101, Inceptionv3, Densenet201, and Mobilenetv2.

Clone Identification

Figures 7A, 7B:
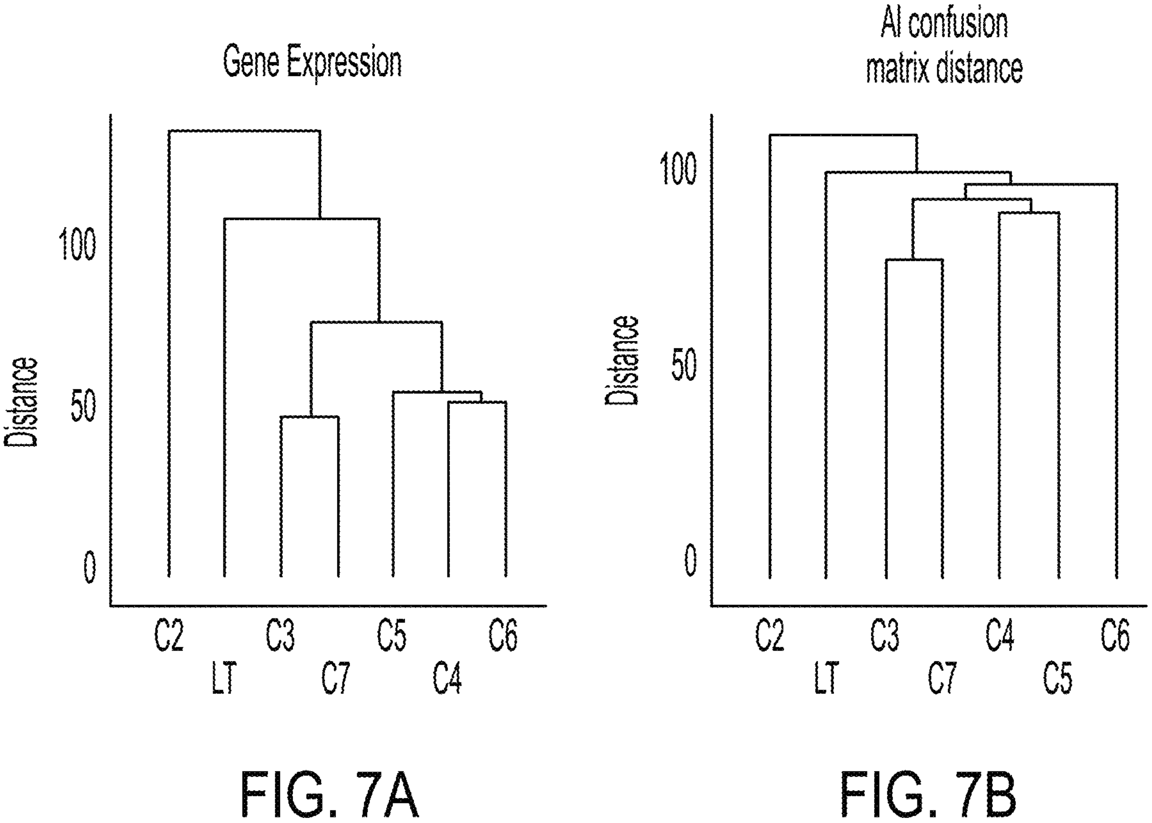
FIGS. 7A-7B show similarity between a gene expression dendrogram and a dendrogram generated from a confusion matrix when evaluating performance of a machine learning model for clone identification, according to some embodiments of the technology described herein.

Four models were evaluated for their ability to distinguish between clones from a single image. The highest accuracy for this method among the four models tested was 79.36%, lower than one would expect if the AI could perfectly distinguish clones. However, the resulting confusion matrix could be used to generate a dendrogram (FIG. 7B) on the basis of distance between clones, which appears strikingly similar to the gene expression dendrogram for the clones (FIG. 7A), supporting the notion that simple brightfield images contain sufficient information for evaluating human pluripotent stem cells (hPSCs). Table 1 shows the performance of each model in distinguishing between the clones.

TABLE 1

Performance of models in distinguishing between clones.

| Model | Time to Complete Training | Validation Accuracy | # of Misclassified Test Dataset | Accuracy of Trained Model on Test Dataset | # of Misclassified Training Dataset | Accuracy of Trained Model on Training Dataset |
|---|---|---|---|---|---|---|
| Xception | 506 min | 72.50% | 375 | 71.67% | 1071 | 72.01% |
| Resnet101 | 322 min | 69.07% | 401 | 68.30% | 1098 | 68.80% |
| Inceptionv3 | 328 min | 73.43% | 379 | 72.90% | 1059 | 74.70% |
| Densenet201 | 451 min | 79.36% | 286 | 79.60% | 810 | 80.70% |

The model was trained using MATLAB 2020b running in an AWS EC2 p3.2×large instance. To create a training set for clone identification, 1,000 random images from each clone were selected for a total of 7,000 images. Of these, 60% were used for training, 20% were used for validation during training, and 20% were used for testing and evaluating the trained model. The pretrained model used for clone identification with transfer learning was Densenet201. The final model had a validation accuracy of 79.36%. Table 2 shows example hyperparameters and their corresponding values used to support the transfer learning.

TABLE 2

Example hyperparameters.

| Hyperparameter | Value |
|---|---|
| Solver | SDGM |
| Momentum | 0.9 |
| Initial Learning Rate | 0.001 |
| Learn Rate Schedule | Piecewise |
| Learn Rate Drop Factor | 0.1 |
| Learn Rate Drop Period | 10 |
| L2 Regularization | 1.0000e−04 |
| Gradient Threshold Method | L2norm |
| Gradient Threshold | Inf |
| Max Epochs | 10 |
| Mini Batch Size | 100 |
| Verbose | 1 |
| Verbose Frequency | 50 |
| Validation Frequency | 20 |
| Validation Patience | 5 |
| Shuffle | Every epoch |
| Execution Environment | Single GPU |

Image Classification

For image classification (i.e., determining clone quality), the training data were generated by classifying individual images for each clone into either pluripotent or differentiated classifications until a balanced data set of similarly sized classes was created for each of the clones. The models were then trained to distinguish between images that showed undifferentiated hPSCs and one that contained differentiated cell types, achieving a 95.87% accuracy.

The model was trained using MATLAB 2020b running in an AWS EC2 p3.2×large instance. To create a training set for image classification (i.e., determining clone quality), images from several hPSC clones and the hPSC line from Life Technologies were used and separated into hPSC and non-hPSC classes. The original images were acquired in 6 well plates and were size 1958×1958 and were tiled into four 979×979 images to use for training. Clone images were selected for each class for a total of 2400 images. Of these, 60% were used for training, 20% were used for validation during training, and 20% were used for testing and evaluating the trained model. The pretrained model used for determining clone quality with transfer learning was Resnet101. The final model had a validation accuracy of 95.87%. Table 3 shows example hyperparameters and their corresponding values used to support transfer learning.

TABLE 3

Example hyperparameters.

| Hyperparameter | Value |
|---|---|
| Solver | SDGM |
| Momentum | 0.9 |
| Initial Learning Rate | 0.001 |
| Learn Rate Schedule | Piecewise |
| Learn Rate Drop Factor | 0.1 |
| Learn Rate Drop Period | 10 |
| L2 Regularization | 1.0000e−04 |
| Gradient Threshold Method | L2norm |
| Gradient Threshold | Inf |
| Max Epochs | 10 |
| Mini Batch Size | 100 |
| Verbose | 1 |
| Verbose Frequency | 50 |
| Validation Frequency | 10 |
| Validation Patience | 5 |
| Shuffle | Every epoch |
| Execution Environment | Single GPU |

Semantic Segmentation

Thirty-two random images were selected for each clone and pixels were user-painted according to the three classes—undifferentiated hPSC, differentiated cell, and background. After training, the final model had an accuracy of 95.99%. Tables 4-1, 4-2, and 4-3 shows the performance of each model in performing semantic segmentation on the different image datasets for training and testing the final semantic segmentation model.

TABLE 4-1

Performance of models in performing semantic segmentation.

| Model | Time to Complete Training | Validation Accuracy | Global Accuracy of Trained Model on Test Dataset | Weighted IoU Score of Trained Model on Test Dataset |
|---|---|---|---|---|
| Mobilenetv2 | 10 min | 94.86% | 0.941 | 0.863 |
| Xception | 64 min | 92.71% | 0.918 | 0.824 |
| Resnet18 | 10 min | 96.05% | 0.946 | 0.9 |
| Resnet50 | 11 min | 95.99% | 0.965 | 0.934 |

TABLE 4-2

Performance of models in performing semantic segmentation.

| Model | Mean BF Score of Trained Model on Test Dataset | iPSC Pixel Prediction Accuracy of Trained Model on Test Dataset | Non-iPSC Pixel Prediction Accuracy of Trained Model on Test Dataset | Global Accuracy of Trained Model on Training Dataset |
|---|---|---|---|---|
| Mobilenetv2 | 0.689 | 0.96 | 0.85 | .095 |
| Xception | 0.647 | 0.91 | 0.89 | 0.939 |

TABLE 4-2-continued

Performance of models in performing semantic segmentation.

| Model | Mean BF Score of Trained Model on Test Dataset | iPSC Pixel Prediction Accuracy of Trained Model on Test Dataset | Non-iPSC Pixel Prediction Accuracy of Trained Model on Test Dataset | Global Accuracy of Trained Model on Training Dataset |
|---|---|---|---|---|
| Resnet18 | 0.735 | 0.94 | 0.91 | 0.968 |
| Resnet50 | 0.768 | 0.98 | 0.86 | 0.968 |

TABLE 4-3

Performance of models in performing semantic segmentation.

| Model | Weighted IoU Score of Trained Model on Training Dataset | Mean BF Score of Trained Model on Training Dataset | iPSC Pixel Prediction Accuracy of Trained Model on Training Dataset | Non-iPSC Pixel Prediction Accuracy of Trained Model on Training Dataset |
|---|---|---|---|---|
| Mobilenetv2 | 0.86 | 0.708 | 0.96 | 0.82 |
| Xception | 0.848 | 0.667 | 0.92 | 0.89 |
| Resnet18 | 0.94 | 0.776 | 0.97 | 0.95 |
| Resnet50 | 0.94 | 0.792 | 0.97 | 0.95 |

Figure 7C:
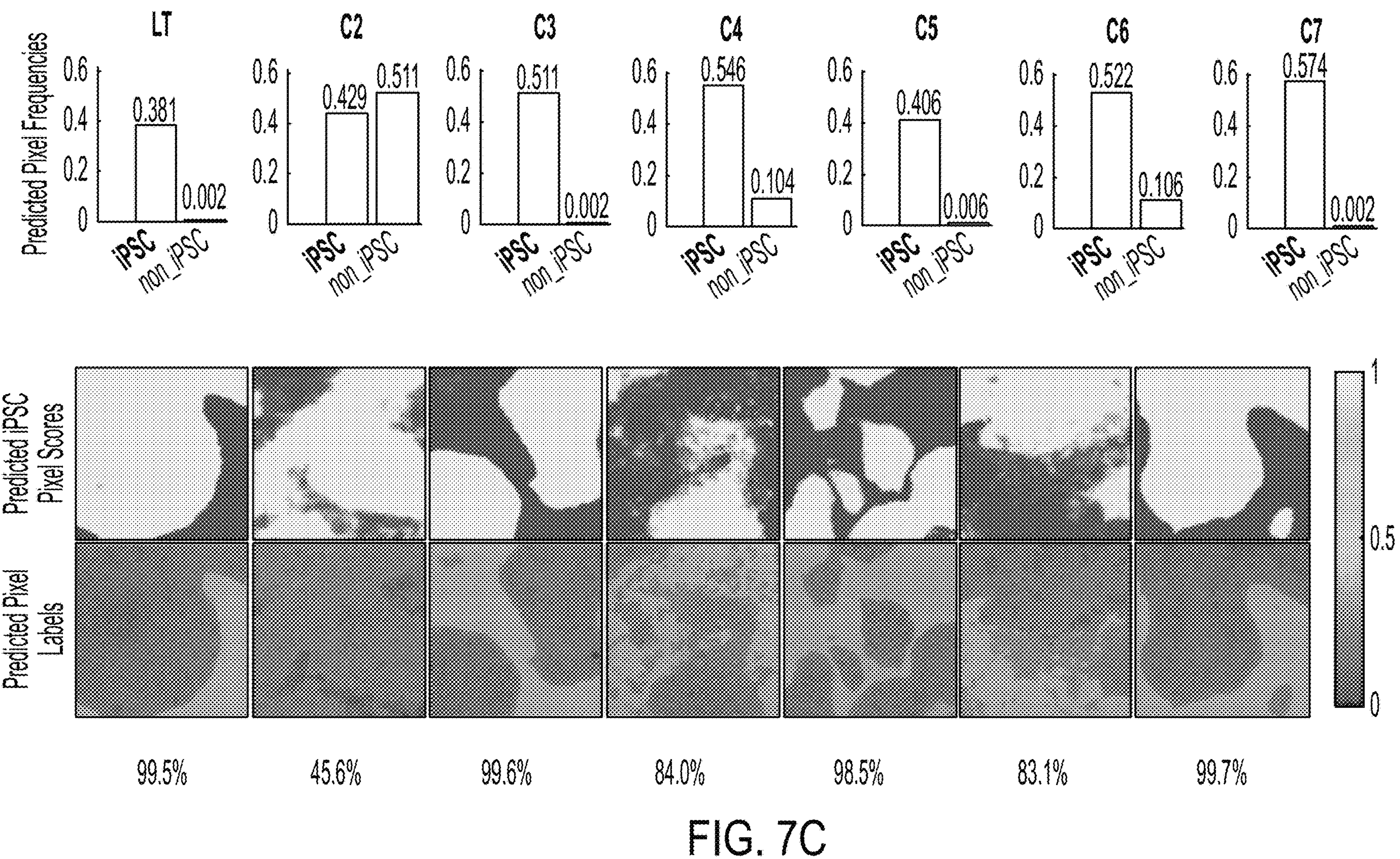
FIG. 7C shows that the segmentation techniques, in accordance with embodiments of the technology described herein, can be used to differentiate between pixels associated with iPSCs, non-iPSCs, and background.
Figure 7D:
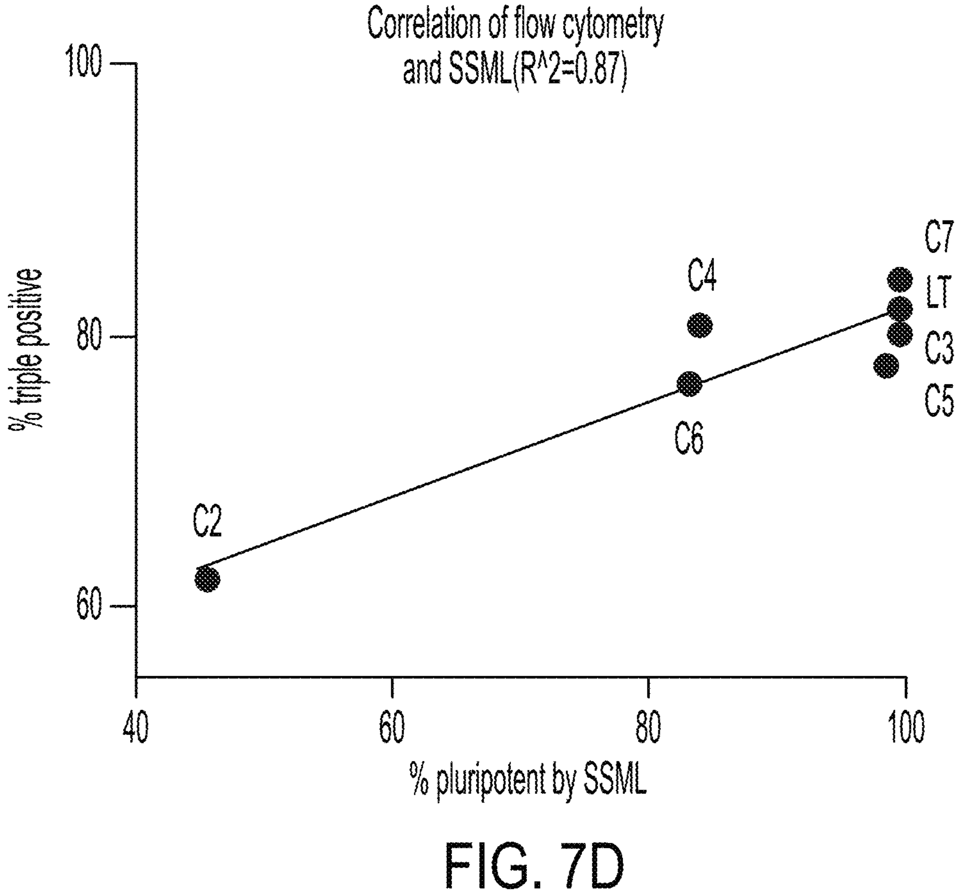
FIG. 7D shows that the segmentation techniques, in accordance with embodiments of the technology described herein, can be used to accurately predict the frequency of pixels associated with iPSCs.

The results can be visualized as either a percent likelihood for each class or a combined pixel painted image. FIG. 7C shows pixel likelihood images for the hPSC class (middle row) and the corresponding images output from the semantic segmentation model (bottom row). Frequency of hPSC pixels to total pixels that contained cells were calculated to score and rank the clones according to their pluripotency. The bar plots in FIG. 7C indicate the proportion of iPSCs (e.g., undifferentiated) to non-iPSCs. As shown in FIG. 7D, the frequency of undifferentiated hPSC pixels strongly correlated with the percentage of triple positive cells measured by flow cytometry, indicating that semantic segmentation can successfully estimate the cellular composition for each hPSC clone and report a quantitative score that can be used to rank the clones, as shown in Table 5.

Because spatial information is also obtained, semantic segmentation is the superior method for conducting hPSC quality assessments, as compared to other models. While there are examples of image-based classification of hPSCs, using U-Net, to evaluate the presence of differentiated cells, these examples are not capable of assigning classifications at single pixel resolution, a clear strength of using semantic segmentation.

TABLE 5

Ranking quality of hPSC lines using different methods.

| PluriTest | Manual Ranking | Rank by Fluorescence-Activated Cell Sorting (FACS) | Gene Expression | Image Classification | Semantic Segmentation |
|---|---|---|---|---|---|
| C2 | C2 | C2 | C2 | C2 | C2 |
| C6 | C4 | C6 | C4 | C4 | C6 |
| C5 | C6 | C5 | C6 | C6 | C4 |
| C4 | C5 | C3 | C5 | C5 | C5 |
| C3 | C3 | C4 | C7 | C3 | LT |
| C7 | C7 | LT | C3 | LT | C3 |
| LT | LT | C7 | LT | C7 | C7 |

The model was trained using MATLAB 2020b running in an AWS EC2 p3.2×large instance. To create a training set to segment hPSC, non-hPSC and background in images, 32 random images of each hPSC clone were selected for a total of 224 images. Of these, 60% were used for training, 20% were used for validation during training, and 20% were used for testing and evaluating the trained model. The pixel labels were created using MATLAB Image Labeler to label pixels as hPSC, non-hPSC or background. The semantic segmentation network used to train this model was Deeplabv3+ and the base pretrained network was Resnet50. The final model had a validation accuracy of 95.99%, a weighted intersection over union (IoU) score of 0.94, and a mean boundary F1 (BF) score of 0.792. The IoU and BF scores are calculated on the training dataset. The IoU is the ratio of correctly classified pixels to the total number of ground truth and predicted pixels in that class. The BF score shows how well the predicted boundary of each class aligns with the true boundary. Table 6 shows example hyperparameters and their corresponding values used for the transfer learning.

TABLE 6

Example hyperparameters.

| Hyperparameter | Value |
|---|---|
| Solver | SDGM |
| Momentum | 0.9 |
| Initial Learning Rate | 1.000e−05 |
| Learn Rate Schedule | Piecewise |
| Learn Rate Drop Factor | 0.1 |
| Learn Rate Drop Period | 3 |
| L2 Regularization | 1.0000e−04 |
| Gradient Threshold Method | L2norm |
| Gradient Threshold | Inf |
| Max Epochs | 7 |
| Mini Batch Size | 5 |
| Verbose | 0 |

TABLE 6-continued

| Example hyperparameters. | |
|---|---|
| Hyperparameter | Value |
| Verbose Frequency | 50 |
| Validation Frequency | 15 |
| Validation Patience | 5 |
| Shuffle | Every epoch |
| Execution Environment | Single GPU |

Example Density Estimation Techniques

Experiments were performed to evaluate machine learning techniques for predicting the number of hPSCs within a colony. A convolutional neural network (CNN) was used to generate both an accurate count and physical location of the cells by generating a three-dimensional density map in which density is distributed along x- and y-coordinates of an image. Aspects of the CNN are described in Sindagi, V. A. and Patel, V. M. J. "CNN-based Cascaded Multi-task Learning of High-level Prior and Density Estimation for Crowd Counting." arXiv:1707.09605 (2017), which is incorporated by reference herein in its entirety.

Figure 8A:
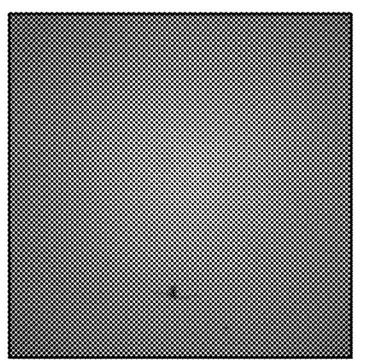
FIGS. 8A-8C show that the density estimation techniques, in accordance with some embodiments of the technology described herein, can be used to generate a density map of a brightfield image.
Figure 8A:
Figure 8B:
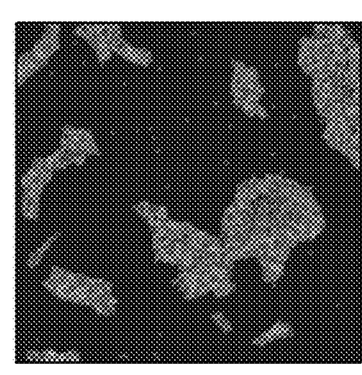
Figure 8C:
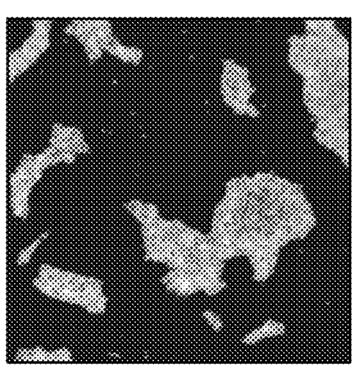

To test whether this CNN could be trained to detect hPSCs at single cell resolution, aligned brightfield and Hoechst-stained images of hPSC colonies plated in 96-well format were obtained using an automated microscope, such as the automated microscope described with respect to the section "Example Automated Platform." Example aligned brightfield and Hoechst-stained images are shown in FIGS. 8A and 8B, respectively. Centroids were identified using the Hoechst-stained images and converted to a density map using Image-J/FIJI to serve as ground truth for training the model. The corresponding density map is shown in FIG. 8C.

Figure 9:
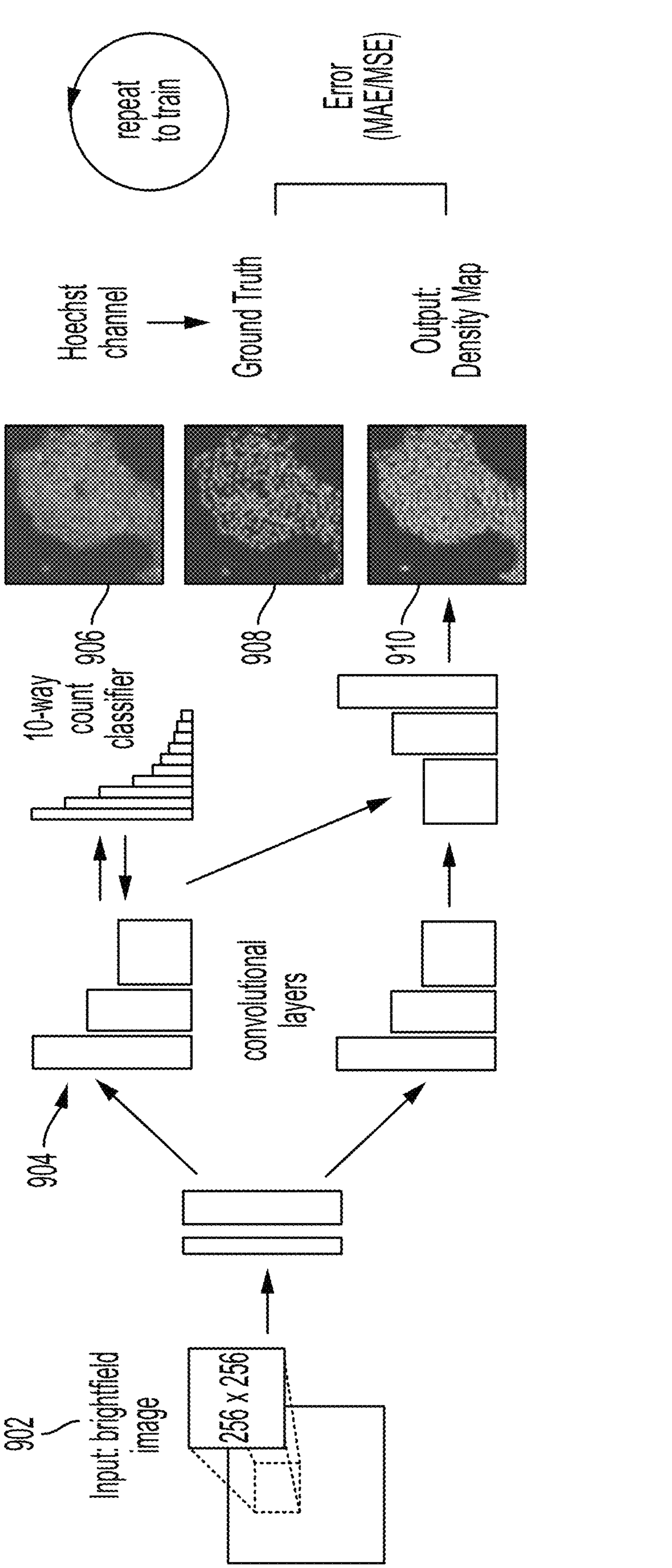
FIG. 9 shows an example process for training a machine learning model to generate a density map for a cell culture, according to some embodiments of the technology described herein.
Figure 10A:
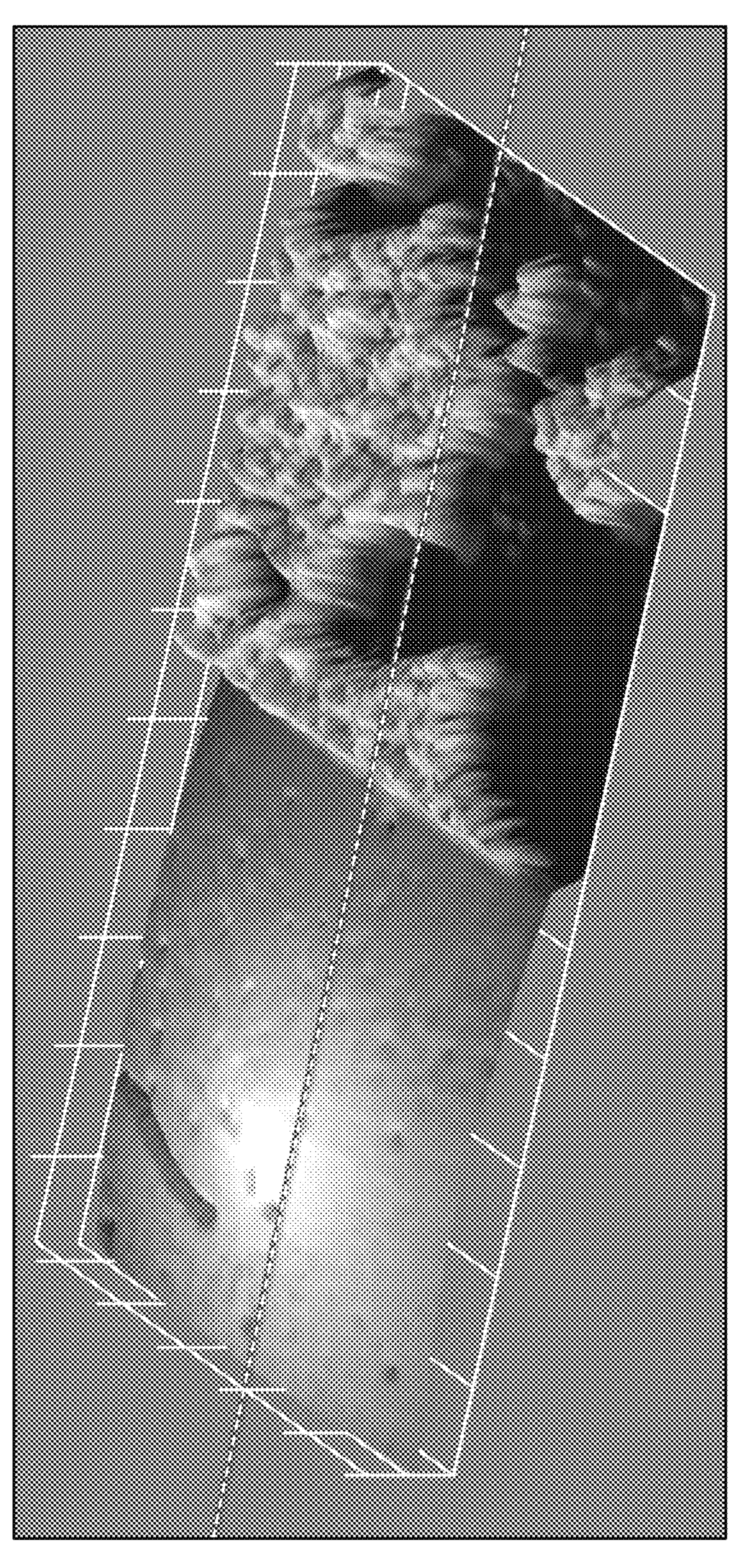
FIGS. 10A-10B show that the density estimation techniques, in accordance with some embodiments of the technology described herein, can be used to estimate the number of cells depicted in a brightfield image.
Figure 10B:
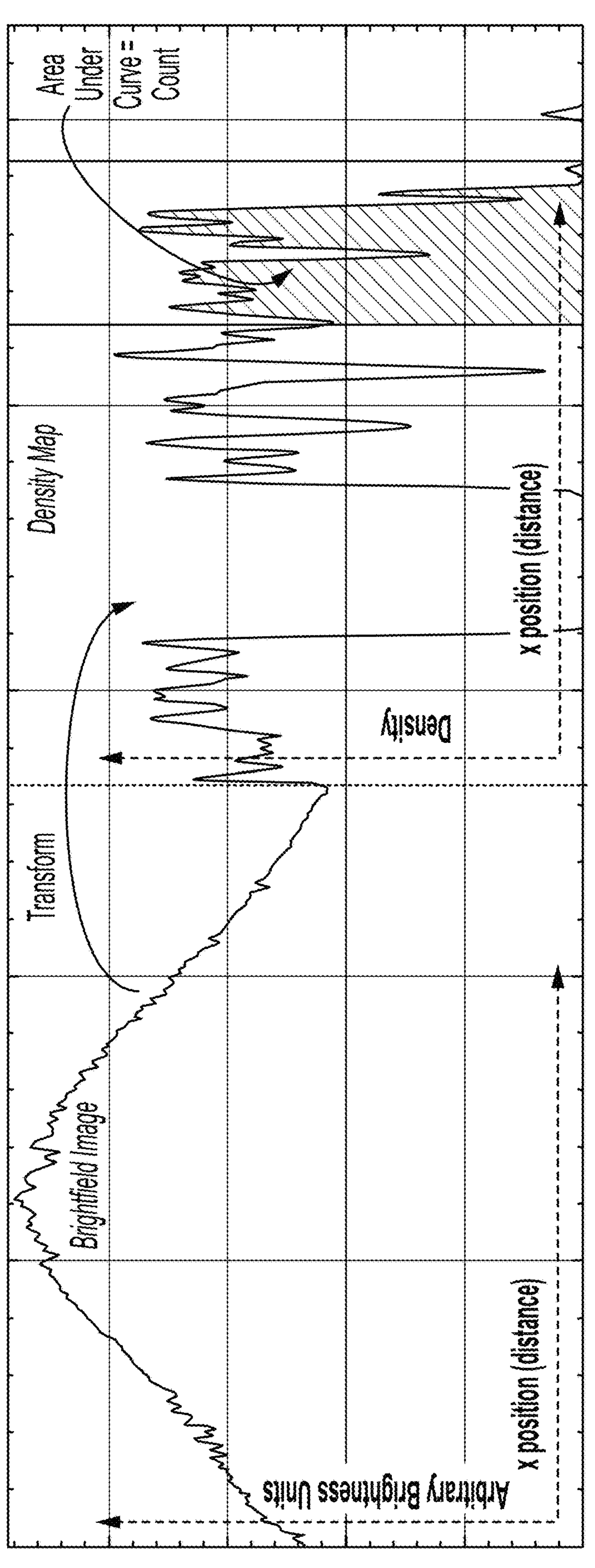

As shown in FIG. 9, the image-based CNN is comprised of two parallel processes filtered through convolutional layers 904. One half (top) approximates counts and classifies an image 902 into a 10-way count classifier with the intention of classifying images based on the approximate number of cells within the field. The information is used to inform the second half (bottom) to generate a density map 910 with local maximal densities representing individual nuclei. Through repeated training rounds (epochs) the connections between individual layers of the CNN are either strengthened or weakened on the basis of similarity of the model-generated density map to the ground truth density map 908 derived from Hoechst-stained image 906. Images were run through intermediate models captured at even epochs and the results were output as density maps to capture the CNN training process. The model underwent a trial-and-error phase from epoch 8-48 before determining the proper density localization, including an inverted density map in which density was assigned to the empty portions of the dish before finding the correct approximate distribution. By epoch 60, gross colony morphology and positions were correctly determined and further refined throughout iteration. This learning process coincided with a minimization of the training loss, mean average error, and mean square error. The training was halted to select the model from epoch 680 as a minimum mean average error and mean squared error. The resulting model was found to ignore microscopic artifacts including particulate on the bottom of the microwell plate, well edges, bubbles, and variation in focal planes, without augmentation of the original brightfield images (e.g., shown in FIG. 8A), and was used in subsequent experiments (referred to as the optimized model).

Figures 11A, 11B, 11C:
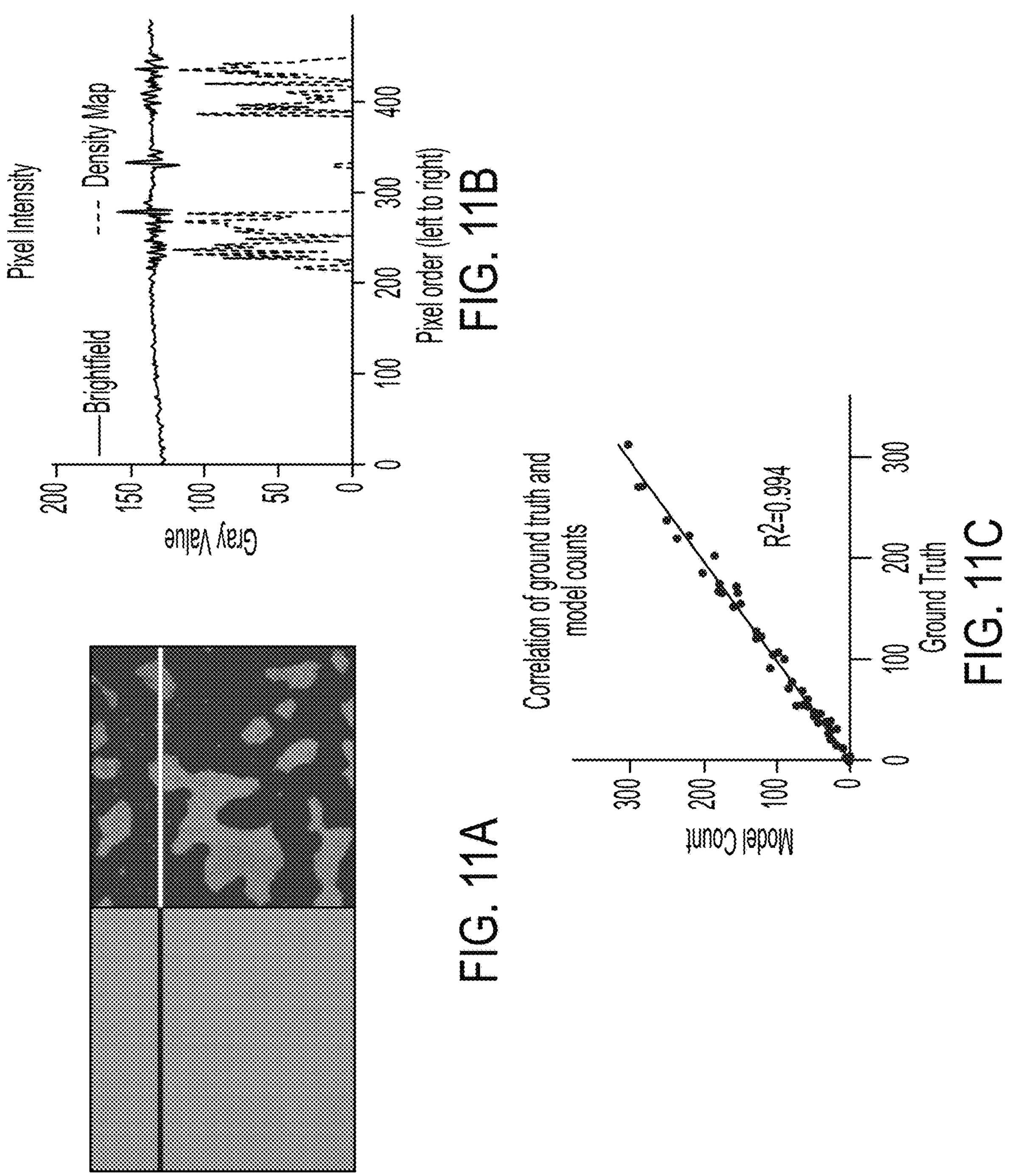
FIGS. 11A-11C show that the density estimation techniques, in accordance with some embodiments of the technology described herein, can be used to accurately estimate the number of cells depicted in a brightfield image when compared to ground truth.

The optimized model is data-rich; it can localize the relative positions of cells in the dish, be sub-divided to generate counts within specific fields of view and summarize larger areas by calculating the area under the curve. To illustrate this point, images can be sliced at given horizontal coordinates and the gray value plotted. FIGS. 10A-10B and FIGS. 11A-11B show comparisons of the magnitude and sharpness in features of the low-contrast original images and the density maps revealed by the model, illustrating the information transformation performed by the trained model. The optimized model was evaluated using newly imaged data as a correlation of the ground truth, provided by fluorescence-based object detection, to the model results demonstrating an R-squared value of 0.994, as shown in FIG. 11C.

Besides the basic tasks of cell counting and discovery of differentiated contaminants, the generated density map contains information that would allow additional analyses. For example, it could be used for mapping cell positions, detecting confluency, and measuring inter-nuclear distances. The method can be easily embedded into an automated process capable of a scale and throughput to meet the demands of automated hPSC culturing. The cell counting, and quality assessment methods can be adapted to a variety of hPSC lines and microscopes through training of new models or transfer learning with as little as a single 96-well plate of hPSCs. The methods can be used as a means for establishing standards when training individuals to conduct hPSC tissue culture work. The methods provide rapid quality control assessments for cells being cultured for use as cell replacement therapies, augmenting existing validation methods like gene expression profiling, flow cytometry, and immunocytochemical analyses.

Figures 12A, 12B:
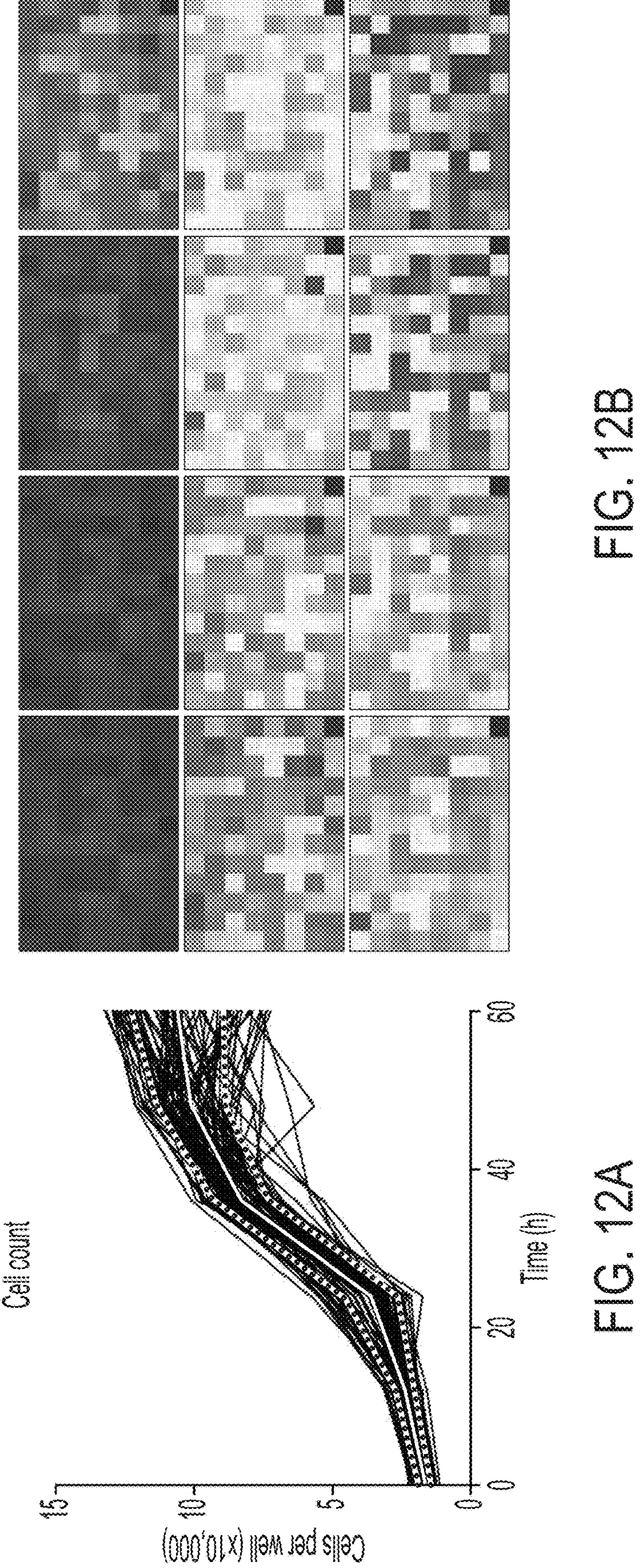
FIGS. 12A-12B show that the density estimation techniques, in accordance with some embodiments of the technology described herein, can be used to monitor the number of cells in wells of a culture plate over time.
Figure 13:
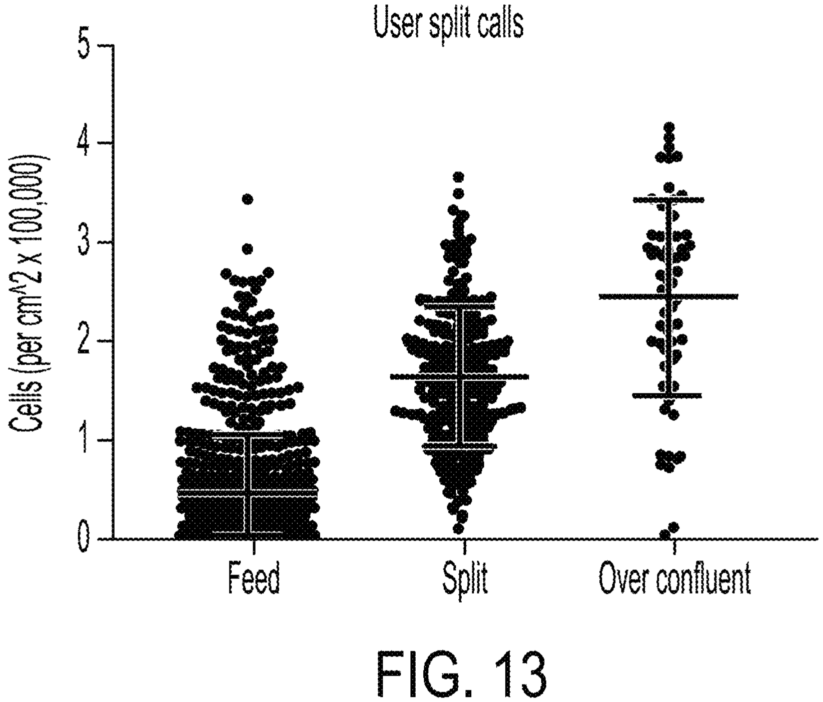
FIG. 13 is a plot showing the number of cells in a culture corresponding to the culture treatment regulation decision for the culture, according to some embodiments of the technology described herein.

The automated system, described herein including at least with respect to the section "Example Automated Platform," was used for acquiring the training data. Full-well images from 27 bar-coded 96-well tissue culture plates were recorded every 12 hours. Images were automatically uploaded to the cloud and cell counts and heat maps were calculated to monitor cell growth over the time course, demonstrating the in-line performance of an automated system over the time of hPSC growth. FIG. 12A shows the cell counts over time. FIG. 12B shows heatmaps of a culture plate, indicating the relative number of cells in each well over time. Split decision training was performed by classifying images of hPSCs that can be fed, split or are considered over confluent. The classifications are shown in FIG. 13. Limitations of the model were determined by either reducing the image area of the dish or degrading the resolution by merging pixels.

Figure 14:
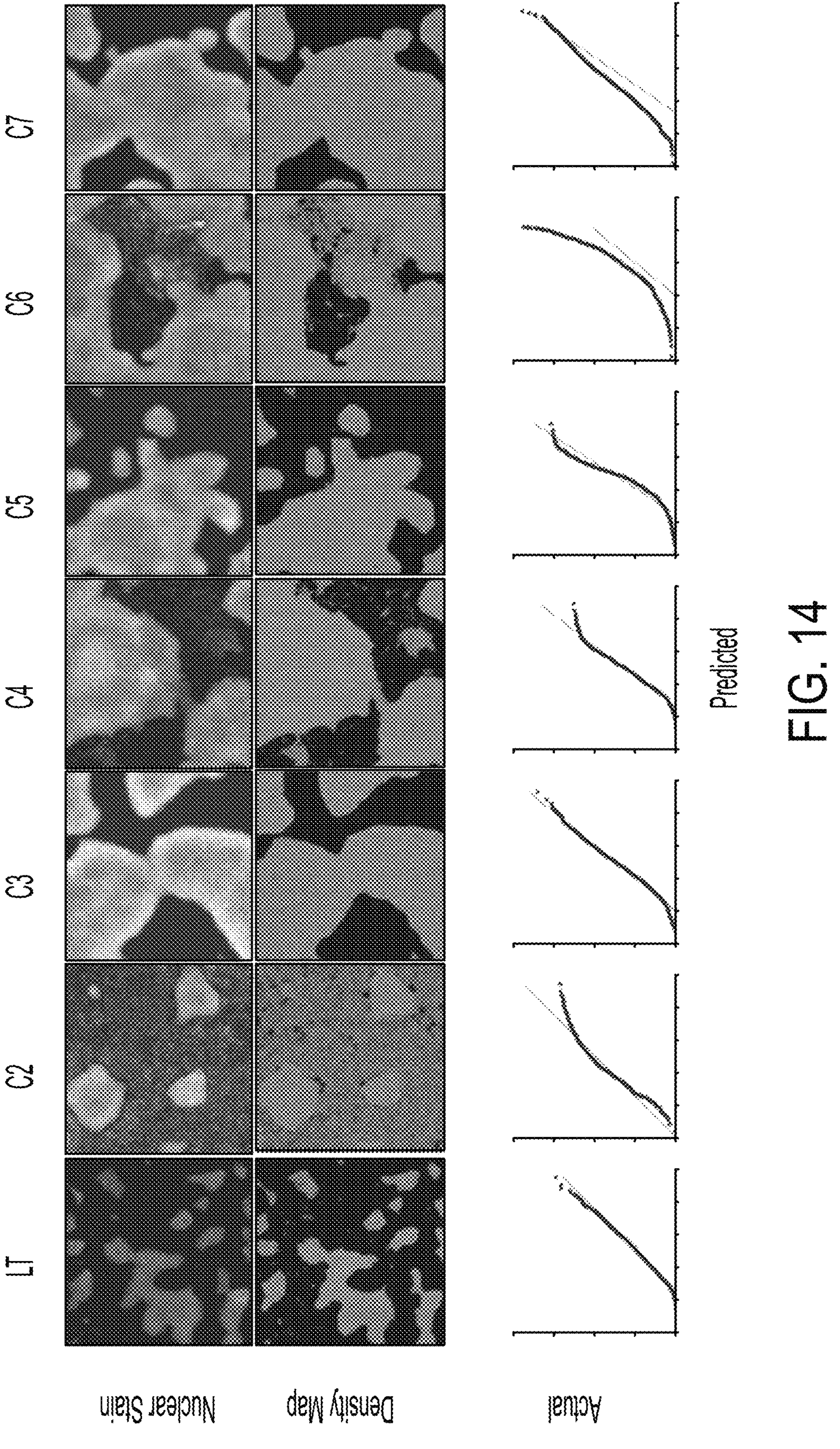
FIG. 14 shows that the culture information prediction techniques can be used to accurately predict the number of cells in a culture, according to some embodiments of the technology described herein.

Density maps were generated for seven hPSC lines using the optimized model, demonstrating in comparison to Hoechst-stained images, as shown in FIG. 14, the accuracy and broad applicability of the model to additional hPSC lines. A normal q-q plot of the cell counts for the hPSC lines was used determining how closely the sampling of individual fields of view fit a normal distribution. As an example, if a differentiation of cells led to confluency across all fields of view, as is seen for C2, the result was a 'middling effect' in which images with median counts are observed more frequently, seen as a concave down curve. In contrast, a concave up curve, depicted for C6, represents a bi-modal distribution compared to a normal distribution.

The model was trained using Amazon SageMaker. An ml.p3.8×large instance was used for training. The custom model and training script from Sendagi, et al. (Sindagi and Patel, 2017) was packaged into a docker image according to SageMaker specifications. All hyperparameters used during training were kept the same as from Sendagi, et al. (Sindagi and Patel, 2017). Training lasted approximately 4 hours.

The training dataset was assembled by randomly selecting 3000 1958×1958 images from a larger dataset of 4608 images acquired from three 96 wells plates. Each image was then reduced in size to 256×256 by taking a random crop from the image. The 3000 images were then manually sorted to remove images that were out of focus or otherwise had defects preventing the nuclei segmentation algorithm from working properly. After manually sorting through the 3000 images, 2375 were selected for training. The fluorescence channel from each image was run through a segmentation algorithm to find the nuclei center points. Aspects of the segmentation algorithm are described in Wang, Y. et al. "Segmentation of the Clustered Cells with Optimized Boundary Detection in Negative Phase Contrast Images." *PloS One,* 10 (2015), which is incorporated by reference herein in its entirety. Those center points were then used to create the ground truth density map as described in (Sindagi and Patel, 2017). The training dataset was then further split into a training and validation dataset, with 80% of the data used for training and 20% of the data used for validation during training.

Experimental Methods

Tissue Culture

The hPSC line was obtained from Life Technologies (Thermo Fisher Scientific) and maintained between passages 25 to 45. The cell line is an episomal reprogrammed line derived from CD34+ hematopoietic somatic cells. hPSCs were fed daily using mTeSR1, passaged using ReLeSR, and attached to hESC-qualified Matrigel (Corning) coated 10 cm and 96 well tissue culture plates. hPSCs were evaluated for pluripotency by flow cytometry, karyotypical abnormalities, and mycoplasma to control for quality of cultures.

The reprogrammed hPSC clones were derived from CD34+ cord blood cells (STEMCELL Technologies). The reprogramming was done using the CytoTune-iPS 2.0 Sendai Reprogramming kit (Invitrogen) and following the instruction manual. Once reprogramming was completed the clones were fed daily using mTeSR1, passaged using ReLeSR, and attached to hESC-qualified Matrigel (Corning) coated 6 well tissue culture plates.

Cell Plating and Staining for Training Dataset

The hPSC line was dissociated from a 10 cm dish using ReLeSR and plated at equal densities on standard flat bottom 96 well microplates (Corning) that were coated with hESC-qualified matrigel. Plates were fixed on subsequent days in one day intervals. All plates were fixed with a final concentration of 3.7% formaldehyde for 20 minutes by adding an equal volume to the media already in the well of 7.4% formaldehyde. To stain the nuclei of the cells a staining solution was made by diluting Hoechst 33342 (Molecular Probes) to 1:5000 in PBS and incubating in the dark for 15 minutes at room temperature. After the incubation the staining solution was removed, and the cells were washed three times with PBS and a sufficient volume (~200 μL) of PBS was added to the wells for imaging.

Imaging and Acquisition Settings

Images were acquired with the Celigo Imaging Cytometer (Nexcelom Bioscience). The illumination for brightfield is a 1 LED-based enhanced brightfield imaging channel with uniform well illumination. There are also 4 LED-based fluorescent channels. A large chip CCD camera along with galvanometric mirrors and an F-theta lens are used to acquire the images at a 1 μLm/pixel resolution. All images are at 10× magnification.

Training plates for the cell counting and density map model were imaged in both brightfield and blue channel. All other plates were imaged in brightfield. Acquisition settings: Brightfield 50 ms exposure; Hoechst 250 ms exposure, excitation 377/50, emission 470/22.

Automated Runs to Confluency

The human hPSC line was dissociated from a 10 cm dish using reLeSR and plated at equal densities on 96 well microplates that were coated with hESC-qualified matrigel. After plating the 96 well microplates were loaded into the Cytomat™ automated incubator in the prototype automated system. Using Overlord™ automation software the plates were set to image all plates and upload those images to an AWS S3 bucket every 12 hours. Images were run through the model on AWS. Outputs of the density estimation techniques described herein, including cell counts, heat maps and growth curves, were used to track cell growth. Plates were maintained until cells grew to confluency.

Continuous Run

The hPSC line was dissociated from a 10 cm dish using reLeSR and plated at four different densities on each of the 96 well microplates that were coated with hESC-qualified matrigel. After plating the 96 well microplates were loaded into the Cytomat™ automated incubator in our prototype automated system. Using Overlord™ automation software the plates were set to image all plates and upload those images to AWS every 12 hours. Outputs of the density estimation techniques described herein were used to determine when plates were ready to split and the split ratio to be used to equilibrate cell densities across each microplate.

Figure 15:
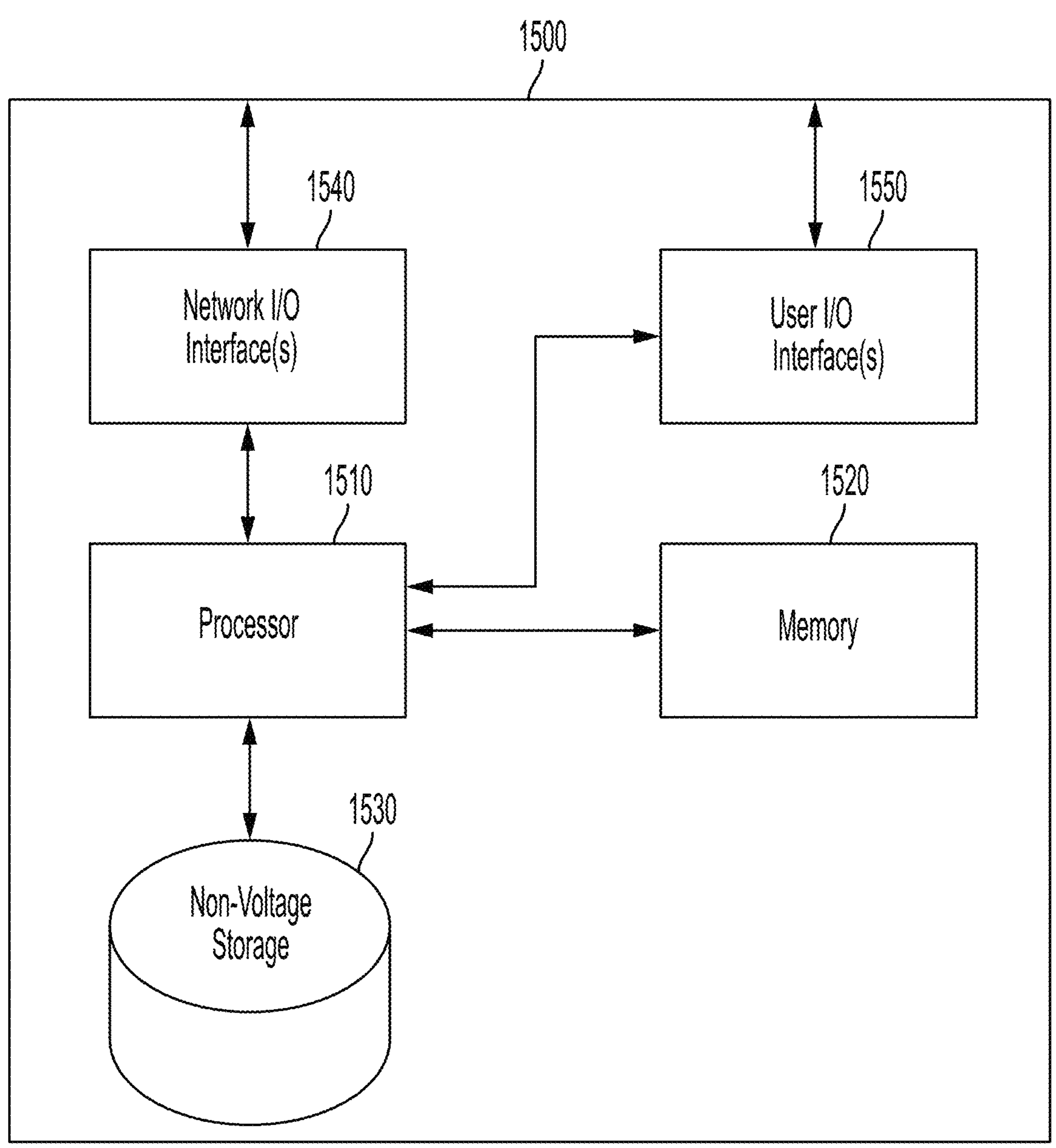
FIG. 15 is a schematic diagram of an illustrative computing device with which aspects described herein may be implemented.

An illustrative implementation of a computer system 1500 that may be used in connection with any of the embodiments of the technology described herein (e.g., such as the methods of FIGS. 2A-2B and 5B) is shown in FIG. 15. The computer system 1500 includes one or more processors 1510 and one or more articles of manufacture that comprise non-transitory computer-readable storage media (e.g., memory 1520 and one or more non-volatile storage media 1530). The processor 1510 may control writing data to and reading data from the memory 1520 and the non-volatile storage device 1530 in any suitable manner, as the aspects of the technology described herein are not limited to any particular techniques for writing or reading data. To perform any of the functionality described herein, the processor 1510 may execute one or more processor-executable instructions stored in one or more non-transitory computer-readable storage media (e.g., the memory 1520), which may serve as non-transitory computer-readable storage media storing processor-executable instructions for execution by the processor 1510.

Computer device 1500 may also include a network input/output (I/O) interface 1540 via which the computing device may communicate with other computing devices (e.g., over a network), and may also include one or more user I/O interfaces 1550, via which the computing device may provide output to and receive input from a user. The user I/O interfaces may include devices such as a keyboard, a mouse, a microphone, a display device (e.g., a monitor or touch screen), speakers, a camera, and/or various other types of I/O devices.

The above-described embodiments can be implemented in any of numerous ways. For example, the embodiments may be implemented using hardware, software, or a combination thereof. When implemented in software, the software code can be executed on any suitable processor (e.g., a microprocessor) or collection of processors, whether provided in a single computing device or distributed among multiple computing devices. It should be appreciated that any component or collection of components that perform the functions described above can be generically considered as one or more controllers that control the above-described functions. The one or more controllers can be implemented in numerous ways, such as with dedicated hardware, or with general purpose hardware (e.g., one or more processors) that is programmed using microcode or software to perform the functions recited above.

In this respect, it should be appreciated that one implementation of the embodiments described herein comprises at least one computer-readable storage medium (e.g., RAM, ROM, EEPROM, flash memory or other memory technology, CD-ROM, digital versatile disks (DVD) or other optical disk storage, magnetic cassettes, magnetic tape, magnetic disk storage or other magnetic storage devices, or other tangible, non-transitory computer-readable storage medium) encoded with a computer program (i.e., a plurality of executable instructions) that, when executed on one or more processors, performs the above-described functions of one or more embodiments. The computer-readable medium may be transportable such that the program stored thereon can be loaded onto any computing device to implement aspects of the techniques described herein. In addition, it should be appreciated that the reference to a computer program which, when executed, performs any of the above-described functions, is not limited to an application program running on a host computer. Rather, the terms computer program and software are used herein in a generic sense to reference any type of computer code (e.g., application software, firmware, microcode, or any other form of computer instruction) that can be employed to program one or more processors to implement aspects of the techniques described herein.

The foregoing description of implementations provides illustration and description but is not intended to be exhaustive or to limit the implementations to the precise form disclosed. Modifications and variations are possible in light of the above teachings or may be acquired from practice of the implementations. In other implementations the methods depicted in these figures may include fewer operations, different operations, differently ordered operations, and/or additional operations. Further, non-dependent blocks may be performed in parallel.

It will be apparent that example aspects, as described above, may be implemented in many different forms of software, firmware, and hardware in the implementations illustrated in the figures. Further, certain portions of the implementations may be implemented as a "module" that performs one or more functions. This module may include hardware, such as a processor, an application-specific integrated circuit (ASIC), or a field-programmable gate array (FPGA), or a combination of hardware and software.

Having thus described several aspects and embodiments of the technology set forth in the disclosure, it is to be appreciated that various alterations, modifications, and improvements will readily occur to those skilled in the art. Such alterations, modifications, and improvements are intended to be within the spirit and scope of the technology described herein. For example, those of ordinary skill in the art will readily envision a variety of other means and/or structures for performing the function and/or obtaining the results and/or one or more of the advantages described herein, and each of such variations and/or modifications is deemed to be within the scope of the embodiments described herein. Those skilled in the art will recognize or be able to ascertain using no more than routine experimentation many equivalents to the specific embodiments described herein. It is, therefore, to be understood that the foregoing embodiments are presented by way of example only and that, within the scope of the appended claims and equivalents thereto, inventive embodiments may be practiced otherwise than as specifically described. In addition, any combination of two or more features, systems, articles, materials, kits, and/or methods described herein, if such features, systems, articles, materials, kits, and/or methods are not mutually inconsistent, is included within the scope of the present disclosure.

The above-described embodiments can be implemented in any of numerous ways. One or more aspects and embodiments of the present disclosure involving the performance of processes or methods may utilize program instructions executable by a device (e.g., a computer, a processor, or other device) to perform, or control performance of, the processes or methods. In this respect, various inventive concepts may be embodied as a computer readable storage medium (or multiple computer readable storage media) (e.g., a computer memory, one or more floppy discs, compact discs, optical discs, magnetic tapes, flash memories, circuit configurations in Field Programmable Gate Arrays or other semiconductor devices, or other tangible computer storage medium) encoded with one or more programs that, when executed on one or more computers or other processors, perform methods that implement one or more of the various embodiments described above. The computer readable medium or media can be transportable, such that the program or programs stored thereon can be loaded onto one or more different computers or other processors to implement various ones of the aspects described above. In some embodiments, computer readable media may be non-transitory media.

The terms "program" or "software" are used herein in a generic sense to refer to any type of computer code or set of computer-executable instructions that can be employed to program a computer or other processor to implement various aspects as described above. Additionally, it should be appreciated that according to one aspect, one or more computer programs that when executed perform methods of the present disclosure need not reside on a single computer or processor but may be distributed in a modular fashion among a number of different computers or processors to implement various aspects of the present disclosure.

Computer-executable instructions may be in many forms, such as program modules, executed by one or more computers or other devices. Generally, program modules include routines, programs, objects, components, data structures, etc. that perform particular tasks or implement particular abstract data types. Typically, the functionality of the program modules may be combined or distributed as desired in various embodiments.

Also, data structures may be stored in computer-readable media in any suitable form. For simplicity of illustration, data structures may be shown to have fields that are related through location in the data structure. Such relationships may likewise be achieved by assigning storage for the fields with locations in a computer-readable medium that convey relationship between the fields. However, any suitable mechanism may be used to establish a relationship between information in fields of a data structure, including through the use of pointers, tags or other mechanisms that establish relationship between data elements.

When implemented in software, the software code can be executed on any suitable processor or collection of processors, whether provided in a single computer or distributed among multiple computers.

Also, a computer may have one or more input and output devices. These devices can be used, among other things, to present a user interface. Examples of output devices that can be used to provide a user interface include printers or display screens for visual presentation of output and speakers or other sound generating devices for audible presentation of output. Examples of input devices that can be used for a user interface include keyboards, and pointing devices, such as mice, touch pads, and digitizing tablets. As another example, a computer may receive input information through speech recognition or in other audible formats.

Such computers may be interconnected by one or more networks in any suitable form, including a local area network or a wide area network, such as an enterprise network, and intelligent network (IN) or the Internet. Such networks may be based on any suitable technology and may operate according to any suitable protocol and may include wireless networks, wired networks or fiber optic networks.

Also, as described, some aspects may be embodied as one or more methods. The acts performed as part of the method may be ordered in any suitable way. Accordingly, embodiments may be constructed in which acts are performed in an order different than illustrated, which may include performing some acts simultaneously, even though shown as sequential acts in illustrative embodiments.

All definitions, as defined and used herein, should be understood to control over dictionary definitions, definitions in documents incorporated by reference, and/or ordinary meanings of the defined terms.

The indefinite articles "a" and "an," as used herein in the specification and in the claims, unless clearly indicated to the contrary, should be understood to mean "at least one."

The phrase "and/or," as used herein in the specification and in the claims, should be understood to mean "either or both" of the elements so conjoined, i.e., elements that are conjunctively present in some cases and disjunctively present in other cases. Multiple elements listed with "and/or" should be construed in the same fashion, i.e., "one or more" of the elements so conjoined. Other elements may optionally be present other than the elements specifically identified by the "and/or" clause, whether related or unrelated to those elements specifically identified. Thus, as a non-limiting example, a reference to "A and/or B," when used in conjunction with open-ended language such as "comprising" can refer, in one embodiment, to A only (optionally including elements other than B); in another embodiment, to B only (optionally including elements other than A); in yet another embodiment, to both A and B (optionally including other elements); etc.

As used herein in the specification and in the claims, the phrase "at least one," in reference to a list of one or more elements, should be understood to mean at least one element selected from any one or more of the elements in the list of elements, but not necessarily including at least one of each and every element specifically listed within the list of elements and not excluding any combinations of elements in the list of elements. This definition also allows that elements may optionally be present other than the elements specifically identified within the list of elements to which the phrase "at least one" refers, whether related or unrelated to those elements specifically identified. Thus, as a non-limiting example, "at least one of A and B" (or, equivalently, "at least one of A or B," or, equivalently "at least one of A and/or B") can refer, in one embodiment, to at least one, optionally including more than one, A, with no B present (and optionally including elements other than B); in another embodiment, to at least one, optionally including more than one, B, with no A present (and optionally including elements other than A); in yet another embodiment, to at least one, optionally including more than one, A, and at least one, optionally including more than one, B (and optionally including other elements); etc.

In the claims, as well as in the specification above, all transitional phrases such as "comprising," "including," "carrying," "having," "containing," "involving," "holding," "composed of," and the like are to be understood to be open-ended, i.e., to mean including but not limited to. Only the transitional phrases "consisting of" and "consisting essentially of" shall be closed or semi-closed transitional phrases, respectively.

The terms "approximately," "substantially," and "about" may be used to mean within ±20% of a target value in some embodiments, within ±10% of a target value in some embodiments, within ±5% of a target value in some embodiments, within ±2% of a target value in some embodiments. The terms "approximately," "substantially," and "about" may include the target value.

The invention claimed is:

1. A method of regulating treatment of a culture, the culture comprising a plurality of cells, cells in the plurality of cells having one or more respective cell categories selected from a plurality of cell categories, the plurality of cell categories including a first cell category and a second cell category, the method comprising:

processing an image of the plurality of cells of the culture to identify, from among the plurality of cell categories, one or more cell categories of cells depicted in the image, the processing comprising:

segmenting the image into a plurality of image segments by assigning individual pixels in the image to corresponding cell categories in the plurality of cell categories, the assigning comprising determining, for each of the individual pixels, a respective plurality of values corresponding to a respective plurality of cell categories, each of the respective plurality of values indicating a likelihood that the individual pixel corresponds to a cell of a respective cell category in the plurality of cell categories, wherein the plurality of image segments comprises:

a first image segment comprising pixels associated with cells of the first cell category; and a second image segment comprising pixels associated with cells of the second cell category;

determining, based on the plurality of image segments into which the image is segmented, an amount of cells in the culture corresponding to the first cell category; and regulating the treatment of the culture based on the determined amount of cells in the culture corresponding to the first cell category.

2. The method of claim 1, wherein:

assigning the individual pixels in the image to the corresponding cell categories in the plurality of cell categories comprises classifying the individual pixels according to a plurality of classes, wherein a first class of the plurality of classes corresponds to the first cell category and a second class of the plurality of classes corresponds to the second cell category, and classifying the individual pixels comprises, for each of the individual pixels, selecting a class into which to classify the individual pixel based on the determined respective plurality of values.

3. The method of claim 1, wherein the assigning is performed using a trained machine learning model, the assigning comprising:

processing the image using the trained machine learning model to obtain, for each of the individual pixels, the respective plurality of values corresponding to the respective plurality of cell categories.

4. The method of claim 3, wherein the trained machine learning model comprises a deep neural network model comprising one or more convolutional layers, wherein the deep neural network model comprises a cascade of deep neural network blocks, each of the deep neural network blocks comprising a respective deep convolutional neural network (CNN), and wherein the trained machine learning model performs computations at least in part using atrous spatial pyramid pooling.

5. The method of claim 4, wherein the deep neural network model comprises at least one million, at least five million, at least 10 million, at least 50 million, at least 100 million, at least 500 million or at least 1 billion parameters whose values are used as part of processing the image using the deep neural network model.

6. The method of claim 1, further comprising:

processing the image of the plurality of cells of the culture to estimate culture information for the culture, the culture information for the culture indicating density of cells in the culture of the plurality of cells, wherein segmenting the image comprises segmenting the image based on the culture information.

7. The method of claim 6, wherein the culture information is used to determine coordinates of cells of the plurality of cells, and wherein segmenting the image based on the culture information comprises providing the image and the coordinates as an input to a trained machine learning model to obtain an output indicative of the respective likelihoods that each of the individual pixels corresponds to one of the plurality of cell categories.

8. The method of claim 1, further comprising:

processing the image of the plurality of cells of the culture to estimate culture information for the culture, the culture information for the culture indicating density of cells in the culture of the plurality of cells, wherein regulating the treatment of the culture comprises regulating the treatment of the culture based on the culture information and the determined amount of cells in the culture corresponding to the first cell category.

9. The method of claim 8, wherein the culture information is used to determine coordinates of cells depicted in the image, and wherein regulating the treatment of the culture based on the culture information comprises:

using the coordinates to determine a location of one or more cells of the plurality of cells; and removing the one or more cells from the determined location of the one or more cells of the plurality of cells.

10. The method of claim 8, wherein regulating the treatment of the culture based on the culture information and the determined amount of cells in the culture corresponding to the first cell category comprises:

outputting a recommendation indicating a time for passaging cells of the plurality of cells of the culture and/or a recommended number of new cultures into which to split the culture.

11. The method of claim 1, wherein regulating the treatment of the culture comprises outputting, based on the determined amount of cells in the culture corresponding to the first cell category, a recommendation for modifying a manner in which one or more materials are added to the culture to affect growth of the culture.

12. The method of claim 1, wherein regulating the treatment of the culture comprises modifying a manner in which one or more materials are added to the culture to affect growth of the culture.

13. The method of claim 1, wherein regulating the treatment of the culture comprises outputting, based on the determined amount of cells in the culture corresponding to the first cell category, a recommendation for passaging cells of the plurality of cells of the culture.

14. The method of claim 1, wherein regulating the treatment of the culture comprises passaging cells of the plurality of cells of the culture.

15. The method of claim 1, wherein regulating the treatment of the culture comprises outputting a recommendation to discard cells of the plurality of cells of the culture.

16. The method of claim 1, wherein regulating the treatment of the culture comprises discarding cells of the plurality of cells of the culture.

17. The method of claim 1, further comprising:

comparing the determined amount of cells in the culture corresponding to the first cell category to a pre-determined amount; and based on the comparing, regulating the treatment of a second culture to cultivate the second culture to have the pre-determined amount of the first cell category.

18. The method of claim 1, wherein the first cell category corresponds to induced pluripotent stem cells (iPSCs) and the second cell category corresponds to non-iPSCs.

19. At least one non-transitory computer-readable storage medium having encoded thereon executable instructions that, when executed by at least one processor, cause the at least one processor to carry out a method of regulating treatment of a culture, the culture comprising a plurality of cells, cells in the plurality of cells having one or more respective cell categories selected from a plurality of cell categories, the plurality of cell categories including a first cell category and a second cell category, the method comprising:

processing an image of the plurality of cells of the culture to identify, from among the plurality of cell categories, one or more cell categories of cells depicted in the image, the processing comprising:

segmenting the image into a plurality of image segments by assigning individual pixels in the image to corresponding cell categories in the plurality of cell categories, the assigning comprising determining, for each of the individual pixels, a respective plurality of values corresponding to a respective plurality of cell categories, each of the respective plurality of values indicating a likelihood that the individual pixel corresponds to a cell of a respective cell category in the plurality of cell categories, wherein the plurality of image segments comprises:

a first image segment comprising pixels associated with cells of the first cell category; and a second image segment comprising pixels associated with cells of the second cell category;

determining, based on the plurality of image segments into which the image is segmented, an amount of cells in the culture corresponding to the first cell category; and regulating the treatment of the culture based on the determined amount of cells in the culture corresponding to the first cell category.

20. A cell imaging and incubation system, comprising:
an imaging sensor configured to obtain an image of a plurality of cells of a culture;
an incubator configured to incubate the culture;
at least one processor; and
at least one non-transitory computer-readable storage medium having encoded thereon executable instructions that, when executed by at least one processor, cause the at least one processor to carry out a method of regulating treatment of a culture, the culture comprising a plurality of cells, cells in the plurality of cells having one or more respective cell categories selected from a plurality of cell categories, the plurality of cell categories including a first cell category and a second cell category, the method comprising:
processing an image of the plurality of cells of the culture to identify, from among the plurality of cell categories, one or more cell categories of cells depicted in the image, the processing comprising:
segmenting the image into a plurality of image segments by assigning individual pixels in the image to corresponding cell categories in the plurality of cell categories, the assigning comprising determining, for each of the individual pixels, a respective plurality of values corresponding to a respective plurality of cell categories, each of the respective plurality of values indicating a likelihood that the individual pixel corresponds to a cell of a respective cell category in the plurality of cell categories,
wherein the plurality of image segments comprises:
a first image segment comprising pixels associated with cells of the first cell category; and a second image segment comprising pixels associated with cells of the second cell category;
determining, based on the plurality of image segments into which the image is segmented, an amount of cells in the culture corresponding to the first cell category; and
regulating the treatment of the culture based on the determined amount of cells in the culture corresponding to the first cell category.

21. The cell imaging and incubation system of claim 20, wherein the method further comprises:
processing the image of the plurality of cells of the culture to estimate culture information for the culture, the culture information for the culture indicating density of cells in the culture of the plurality of cells,
wherein segmenting the image comprises segmenting the image based on the culture information.

22. The cell imaging and incubation system of claim 20, wherein the method further comprises:
processing the image of the plurality of cells of the culture to estimate culture information for the culture, the culture information for the culture indicating density of cells in the culture of the plurality of cells,
wherein regulating the treatment of the culture comprises regulating the treatment of the culture based on the culture information and the determined amount of cells in the culture corresponding to the first cell category.

23. The cell imaging and incubation system of claim 20, wherein regulating the treatment of the culture comprises outputting, based on the determined amount of cells in the culture corresponding to the first cell category, a recommendation for modifying a manner in which one or more materials are added to the culture to affect growth of the culture.

24. The cell imaging and incubation system of claim 20, wherein regulating the treatment of the culture comprises outputting, based on the determined amount of cells in the culture corresponding to the first cell category, a recommendation for passaging cells of the plurality of cells of the culture.

* * * * *